(12) United States Patent
Miao et al.

(10) Patent No.: US 11,888,697 B2
(45) Date of Patent: Jan. 30, 2024

(54) CONFIGURATION SCHEMES FOR SECONDARY CELL, BANDWIDTH PART AND PHYSICAL RESOURCE BLOCK INDEXING

(71) Applicant: Apple Inc., Cupertino, CA (US)

(72) Inventors: Honglei Miao, Munich (DE); Jeongho Jeon, San Jose, CA (US); Alexei Davydov, Nizhny Novgorod (RU); Hong He, Sunnyvale, CA (US); Debdeep Chatterjee, San Jose, CA (US); Joonyoung Cho, Portland, OR (US); Daewon Lee, Portland, OR (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/527,010

(22) Filed: Nov. 15, 2021

(65) Prior Publication Data

US 2022/0078085 A1 Mar. 10, 2022

Related U.S. Application Data

(62) Division of application No. 16/123,722, filed on Sep. 6, 2018, now Pat. No. 11,178,012.

(Continued)

(51) Int. Cl.
*H04L 41/0896* (2022.01)
*H04W 16/32* (2009.01)
(Continued)

(52) U.S. Cl.
CPC .......... *H04L 41/0896* (2013.01); *H04L 5/00* (2013.01); *H04L 5/001* (2013.01); *H04L 5/0098* (2013.01); *H04W 16/32* (2013.01);

*H04W 72/0453* (2013.01); *H04W 76/28* (2018.02); *H04L 5/0007* (2013.01); *H04L 5/0053* (2013.01);
(Continued)

(58) Field of Classification Search
CPC ....... H04L 41/0896; H04L 5/00; H04L 5/001; H04L 5/0098; H04L 5/0007; H04L 5/0053; H04L 5/0094; H04W 16/32; H04W 72/0453; H04W 76/28; H04W 76/27; H04W 88/02
See application file for complete search history.

(56) References Cited

U.S. PATENT DOCUMENTS

2018/0176919 A1* 6/2018 Takahashi ......... H04W 56/0005
2018/0343089 A1* 11/2018 Park ....................... H04L 5/005
(Continued)

*Primary Examiner* — Ricky Q Ngo
*Assistant Examiner* — Kabir U Jahangir
(74) *Attorney, Agent, or Firm* — Sterne, Kessler, Goldstein & Fox P.L.L.C.

(57) ABSTRACT

The disclosure describes configuration schemes for secondary cell (SCell), bandwidth part (BWP) and physical resource block (PRB) indexing. An apparatus of user equipment (UE) for BWP activation and deactivation operation is disclosed. The apparatus includes baseband circuitry that includes a radio frequency (RF) interface, and one or more processors. The one or more processors are to receive radio resource control (RRC) data via the RF interface, configure a timer for a BWP according to the RRC data, and trigger the timer for the BWP in response to detection of an event associated with an access node after the BWP has been activated.

12 Claims, 13 Drawing Sheets

[Carrier with SSB]

[Carrier without SSB]

Related U.S. Application Data

(60) Provisional application No. 62/567,003, filed on Oct. 2, 2017, provisional application No. 62/556,971, filed on Sep. 11, 2017, provisional application No. 62/556,973, filed on Sep. 11, 2017, provisional application No. 62/554,850, filed on Sep. 6, 2017.

(51) Int. Cl.
　　　*H04W 76/28*　　　(2018.01)
　　　*H04L 5/00*　　　　(2006.01)
　　　*H04W 72/0453*　　(2023.01)
　　　*H04W 76/27*　　　(2018.01)
　　　*H04W 88/02*　　　(2009.01)

(52) U.S. Cl.
　　　CPC .......... *H04L 5/0094* (2013.01); *H04W 76/27* (2018.02); *H04W 88/02* (2013.01)

(56) References Cited

U.S. PATENT DOCUMENTS

| | | |
|---|---|---|
| 2018/0343154 A1 | 11/2018 | Park et al. |
| 2019/0028315 A1* | 1/2019 | Park .................. H04L 27/2692 |
| 2019/0044811 A1 | 2/2019 | Miao et al. |
| 2019/0053170 A1 | 2/2019 | Lee et al. |
| 2020/0245295 A1 | 7/2020 | Kimba Dit Adamou et al. |
| 2020/0252180 A1 | 8/2020 | Takeda et al. |
| 2020/0274750 A1* | 8/2020 | Yi ...................... H04L 27/2659 |

* cited by examiner

CONFIGURATION SCHEMES FOR SECONDARY CELL, BANDWIDTH PART AND PHYSICAL RESOURCE BLOCK INDEXING

CROSS-REFERENCE TO RELATED APPLICATIONS

This application is a divisional of U.S. patent application Ser. No. 16/123,722, filed Sep. 6, 2018, which claims the benefit of the following: U.S. provisional application Ser. No. 62/556,973 entitled SECONDARY CELL CONFIGURATION FOR NEW RADIO AND THE PHYSICAL RESOURCE BLOCK INDEX OFFSET SIGNALING FOR SECONDARY CELL WITHOUT SYNCHRONIZATION SIGNAL BLOCK, which was filed on Sep. 11, 2017, U.S. provisional application Ser. No. 62/567,003 entitled ASSOCIATION OF DOWNLINK/UPLINK BANDWIDTH PARTS AND THE BANDWIDTH PART SWITCHING VIA DOWNLINK CONTROL INFORMATION WITHOUT RESOURCE ALLOCATION, which was filed on Oct. 2, 2017, U.S. provisional application Ser. No. 62/554,850 entitled EFFICIENT BANDWIDTH PART ON-OFF OPERATION, which was filed on Sep. 6, 2017, and U.S. provisional application Ser. No. 62/556,971 entitled DOWNLINK CONTROL INFORMATION DESIGN FOR BANDWIDTH PART ACTIVATION/DEACTIVATION AND CROSS-BANDWIDTH PART SCHEDULING, which was filed on Sep. 11, 2017, the contents of all of which are incorporated herein by reference in their entireties.

TECHNICAL FIELD

This disclosure is generally related to configuration schemes for secondary cell (SCell), bandwidth part (BWP) and physical resource block (PRB) indexing, and more specifically to configuration schemes for a SCell carrier, BWP activation/deactivation operations, and common PRB index offset signaling.

BACKGROUND ART

The New Radio (NR) wideband operation capability has direct impact on the peak data rate and may improve user experience. However, since user equipments (UEs) are not always demanding high data rates, the use of wide bandwidth may imply higher idling power consumption both from radio frequency (RF) and baseband signal processing perspectives. In this regard, a concept of bandwidth part (BWP) for NR is proposed to provide a means of operating UEs with smaller bandwidth than the configured channel bandwidth.

A BWP includes a group of contiguous physical resource blocks (PRBs). The bandwidth of a BWP cannot exceed the configured channel bandwidth for the UE, which is chosen in consideration of the UE's RF capability. The bandwidth of the BWP is at least as large as one synchronization signal block (SSB) bandwidth since it is crucial to receive synchronization signals and essential system information in the SS block. Each BWP is associated with a specific numerology, such as subcarrier spacing (SCS) and cyclic prefix (CP) type. Therefore, the BWP is also a means to reconfigure a UE with a certain numerology. The network can configure one or multiple BWPs to a UE via radio resource control (RRC) signaling.

BRIEF DESCRIPTION OF THE DRAWINGS

Other features and advantages of the disclosure will become apparent in the following detailed description of the embodiments with reference to the accompanying drawings, of which.

DESCRIPTION OF THE EMBODIMENTS

Figure 1:
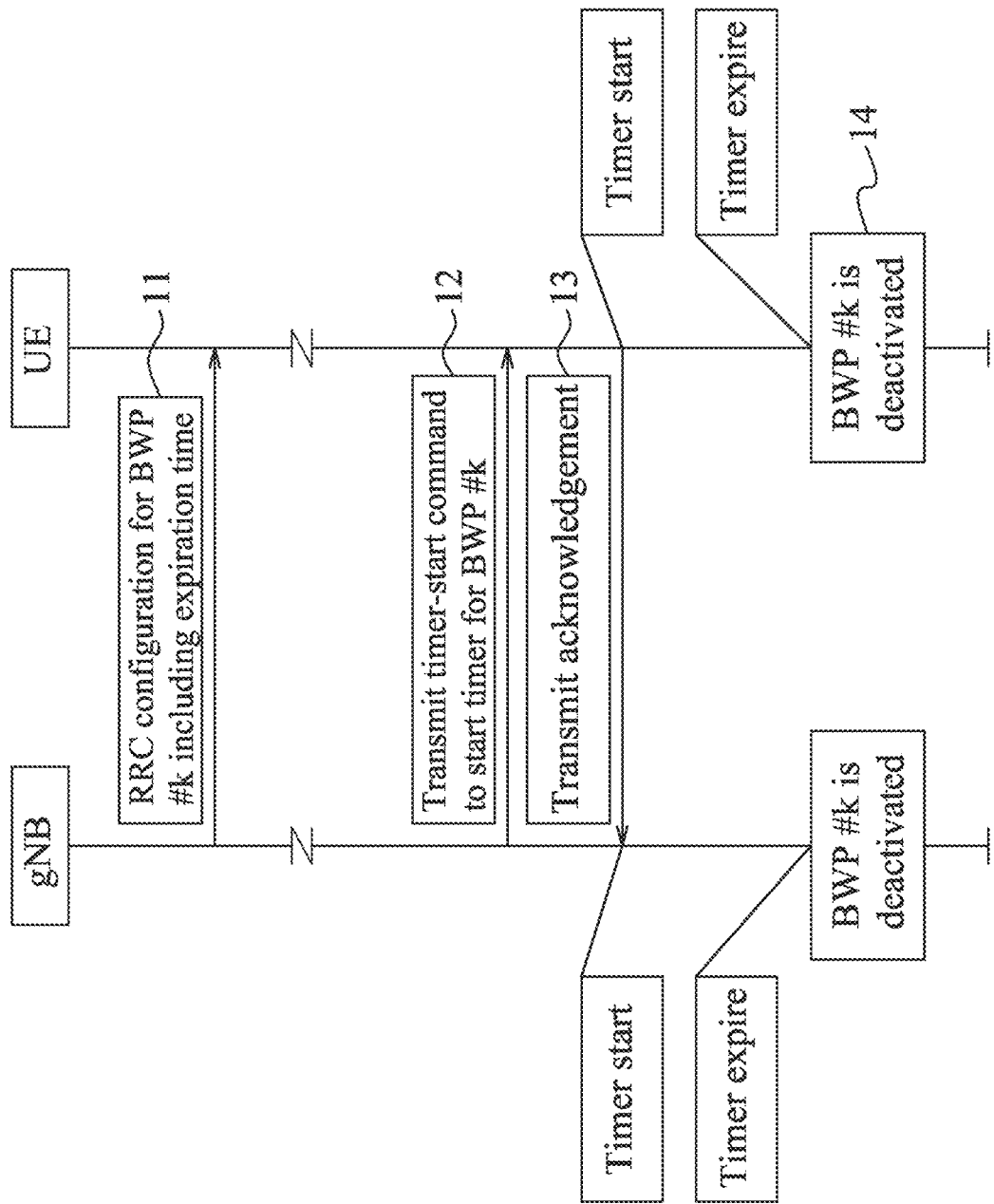
FIG. 1 illustrates a flow chart of a method for timer-based activation/deactivation of BWP according to some embodiments of this disclosure, where the timer is associated with BWP configuration.

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology used herein is for the purpose of describing particular examples only and is not intended to be limiting.

The following description and the accompanying drawings provide specific embodiments to enable those skilled in the art to embody the concept of this disclosure. A number of examples are described with reference to 3GPP (Third Generation Partnership Project) communication systems. It will be understood that principles of the embodiments may be applicable in other types of communication systems, such as Wi-Fi or Wi-Max networks, Bluetooth® or other personal-area networks, Zigbee or other home-area networks, and the like, without limitation, unless specifically stated in this disclosure.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Efficient Bandwidth Part On-Off Operation

According to recent development of 3GPP New Radio (NR), it is agreed that NR supports activation/deactivation of downlink (DL) and uplink (UL) bandwidth parts (BWPs) by explicit indication at least in downlink control information (DCI). In addition to the DCI based explicit activation/deactivation, activation/deactivation of a DL/UL BWP by means of timer(s) for a UE to switch its active DL/UL BWP to a default DL/UL BWP is introduced in this disclosure, and several methods to support efficient BWP on-off operation are proposed. Specifically, different reconfigurable timer approaches are presented.

In some embodiments, for each configured BWP in a UE by radio resource control (RRC) signaling from a radio access network (RAN) node, a timer is configured to enable the UE to autonomously switch off the BWP when the timer expires. Different configured BWPs may have different timers.

There is an initial active DL/UL BWP pair to be valid for the UE until the UE is explicitly (re)configured with BWP(s) during or after RRC connection is established. The initial active DL/UL BWP is confined within the UE minimum bandwidth for the given frequency band. In some embodiments, the default DL/UL BWP is the initial active DL/UL BWP defined above, and has a smaller bandwidth than other configured BWP in the UE. The default DL/UL BWP is able to be reconfigured by the network (e.g., the RAN node).

In some embodiments, the default DL/UL BWP is associated with the timer with largest expiration time which is equal to a discontinuous reception (DRX) time of the UE. Whenever the RAN node reconfigures a BWP to serve as the default DL/UL BWP, an expiration time of a timer for the BWP is updated to the DRX time. On the other hand, if an expiration time of a timer for a certain BWP is reconfigured to the DRX time, this BWP becomes the default DL/UL BWP.

FIG. 1 illustrates an embodiment of a method for timer-based activation/deactivation of BWP, where the timer is associated with BWP configuration. In block 11 of this method, one or a plurality of BWPs are configured by an RRC connection setup message, and an expiration time of a timer for each BWP or a joint timer for the plurality of BWPs is explicitly configured as a BWP configuration parameter of the BWP(s). Specifically, an apparatus of UE includes baseband circuitry that includes a radio frequency (RF) interface, and one or more processors that are to receive RRC data via the RF interface, and that are to configure the timer for the BWP according to the RRC data. The RRC data is acquired from the RRC connection setup message, e.g., by conversion.

In the embodiment shown in FIG. 1, after one of the BWP(s) (such as the BWP numbered "k" as shown in FIG. 1) has been activated, the timer is to be triggered by the RAN node, such as the next Generation NodeB (gNB). Accordingly, in block 12, the gNB attempts to start the timer for the BWP for the UE by RRC signaling. Specifically, the gNB transmits a timer-start command to the UE.

In block 13, in response to receipt of the timer-start command via the RF interface, the one or more processors of the baseband circuitry of the apparatus of UE generate a confirmation of the timer-start command (e.g., an acknowledgement), send the confirmation to the RF interface for transmission back to the gNB, and trigger the timer. On the side of gNB, in response to receipt of the confirmation, a corresponding timer for the BWP is also triggered, i.e., started.

When there are some data scheduled for transmission in the BWP before the timer expires, the timers at the sides of gNB and UE are both disabled, i.e., stopped. The data are, for example, physical downlink control channel (PDCCH) content or physical downlink shared channel (PDSCH) content.

In block 14, when there are no data scheduled for transmission in the BWP before the timer expires, the BWP is deactivated at both the sides of gNB and UE. Specifically, the one or more processors of the baseband circuitry of the apparatus of UE are to deactivate the BWP when it is determined that there is no data transmission in the BWP before the timer expires.

After the deactivation of the BWP, no data transmission, including PDCCH content and PDSCH content, can be scheduled in the BWP before the BWP is reactivated. In some embodiments, different BWPs can be configured with different expiration times. For example, for power consumption optimization, the larger expiration time is configured to a BWP with a smaller bandwidth so that the UE mainly utilizes smaller BWPs for low or medium data rate communication and larger BWPs are only used when high data rate communication is really demanded.

Figure 2:
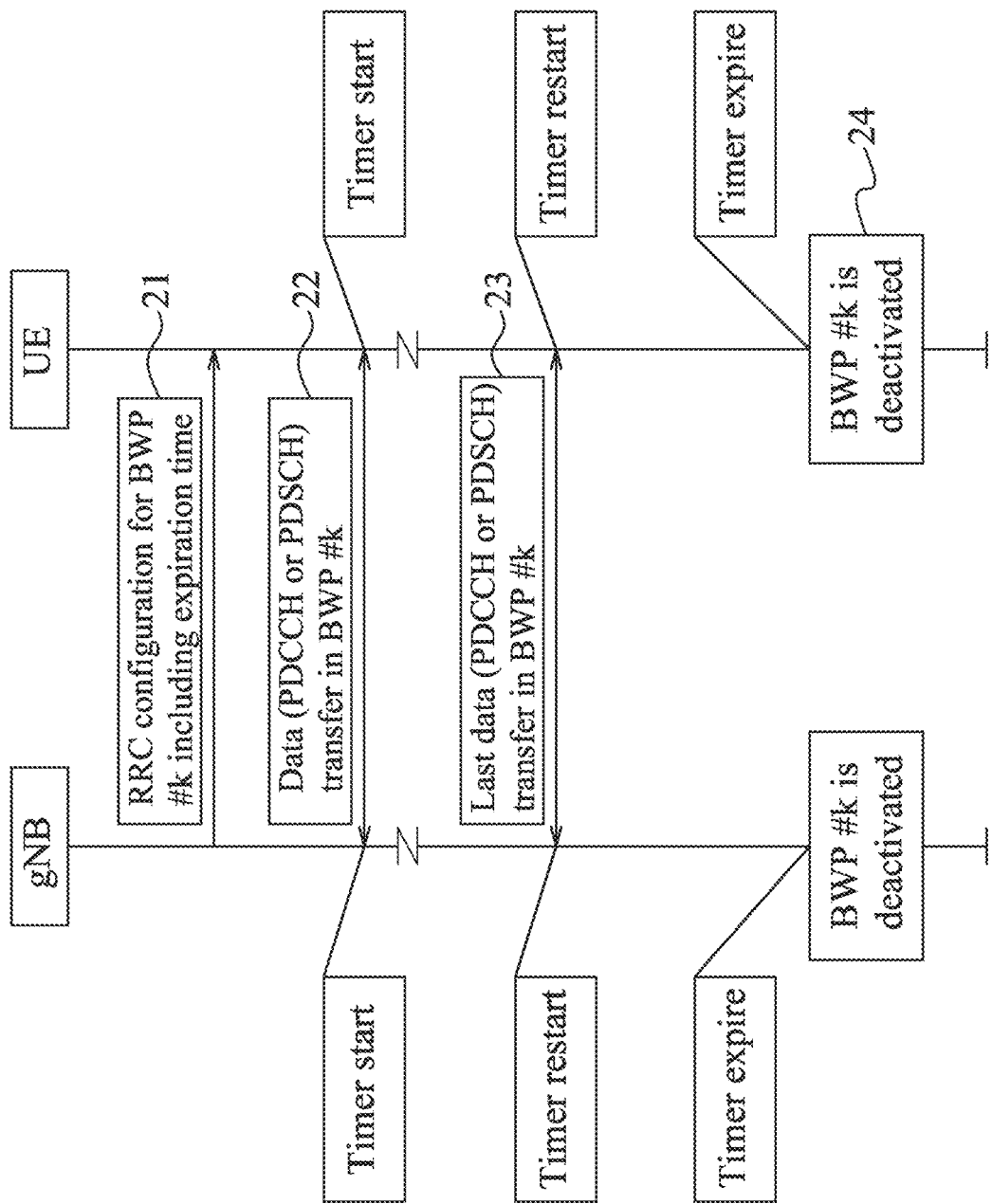
FIG. 2 illustrates a flow chart of another method for timer-based activation/deactivation of BWP according to some embodiments of this disclosure, where the timer is associated with BWP configuration.

FIG. 2 illustrates an embodiment of the method for timer-based activation/deactivation of BWP which is similar to the embodiment of the method illustrated in FIG. 1. In this embodiment, triggering of a timer for a BWP is initiated by detection of an event by the UE, rather than being initiated by the gNB as in the embodiment illustrated in FIG. 1.

In block 21, a timer of a certain BWP (such as the BWP numbered "k" as shown in FIG. 2) is configured by the RRC connection setup message.

In block 22, after the BWP is configured and activated, whenever data are scheduled for transmission in the BWP, the timer for the BWP is triggered (i.e., started). Specifically, the one or more processors of the baseband circuitry of the apparatus of UE are to trigger the timer for the BWP in response to detection of an event that there is data transmission scheduled in the BWP. The data is exemplified as PDSCH content.

In block 23, whenever there are some data, including PDCCH or PDSCH content, transmitted in the BWP, the timers for the BWP at both the sides of gNB and UE are restarted. Specifically, the one or more processors of the baseband circuitry of the apparatus of UE are to restart the timer at the side of UE when it is determined that there is data transmission in the BWP before the timer expires.

In block 24, when there is a continuous time period during which no data is transmitted in BWP, so that the timer for the BWP expires, the BWP is deactivated at both the sides of gNB and UE. Specifically, the one or more processors of the baseband circuitry of the apparatus of UE are to deactivate the BWP when it is determined that there is no data transmission in the BWP before the timer expires.

Figure 3:
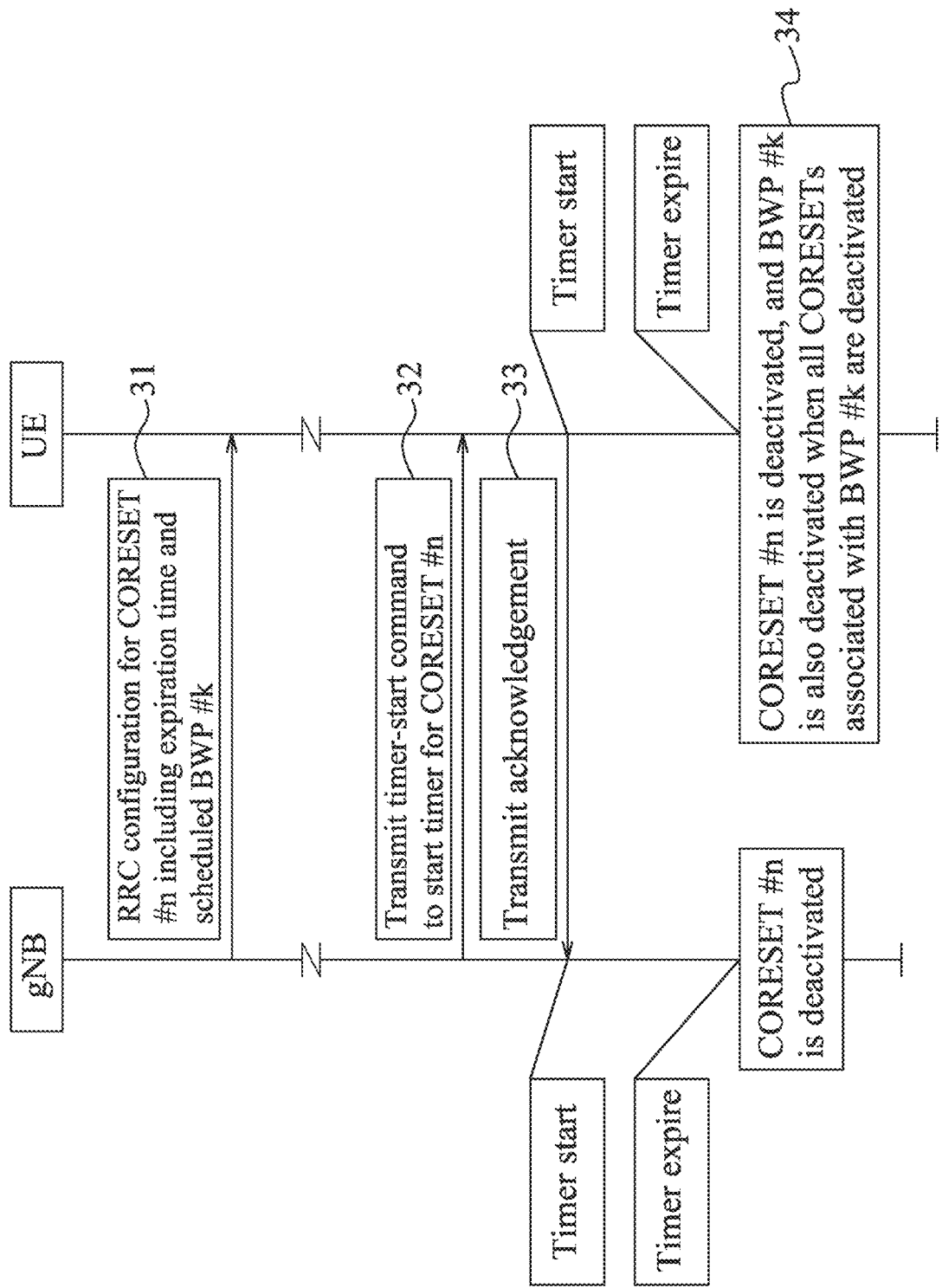
FIG. 3 illustrates a flow chart of a method for timer-based activation/deactivation of BWP according to some embodiments of this disclosure, where the timer is associated with CORESET configuration.

FIG. 3 illustrates an embodiment of a method for timer-based activation/deactivation of BWP, where the timer is associated with control resource set (CORESET) configuration.

In this embodiment, the timer is associated with a CORESET of the BWP instead of the BWP itself, so that if no data of control channel, such as the PDCCH, is transmitted from the CORESET for a configured time period, the monitoring of the control channel and associated BWP is deactivated. Accordingly, for each CORESET associated with a BWP, a timer is configured for the CORESET. When the timer of a CORESET expires, UE is expected to stop monitoring the CORESET so that the CORESET is deactivated. When all CORESETs corresponding to a BWP are deactivated, the corresponding BWP is deactivated as well.

In block 31, one or a plurality of CORESETs are configured by RRC signaling, such as an RRC CORESET configuration message. The RRC signaling includes RRC configuration for one of the CORESETs (such as the CORESET numbered "n" as shown in FIG. 3). The RRC configuration includes an expiration time of a timer for the CORRESET and a scheduled BWP (such as the BWP numbered "k" as shown in FIG. 3). Specifically, the one or more processors of the baseband circuitry of the apparatus of UE are to configure the timer for the CORESET included in the BWP.

After the CORESET has been activated, the timer for the CORESET is to be triggered by the gNB. Accordingly, in block 32, the gNB attempts to start the timer for the CORESET at the side of UE by RRC signaling. Specifically, the gNB transmits a timer-start command to the UE.

In block 33, in response to receipt of the timer-start command from the RF interface, the one or more processors of the baseband circuitry of the apparatus of UE generate a confirmation of the timer-start command (e.g., an acknowledgement), send the confirmation to the RF interface for transmission back to the gNB, and trigger the timer for the CORESET. On the side of gNB, in response to receipt of the confirmation, a corresponding timer for the CORESET is also triggered, i.e., started.

When there is some PDCCH content scheduled for transmission in the CORESET before the timer expires, the timers at the sides of gNB and UE for the CORESET are both disabled, i.e., stopped.

In block 34, when no PDCCH content is transmitted in the CORESET before the timer expires, the CORESET is deactivated at both the sides of gNB and UE. Specifically, the one or more processors of the baseband circuitry of the apparatus of UE are to deactivate the CORESET when it is determined that there is no data transmission in the CORESET before the timer expires.

After the deactivation of the CORESET, no PDCCH data can be scheduled for transmission in CORESET before the CORESET is reactivated. In some embodiments, the one or more processors of the baseband circuitry of the apparatus of UE are to deactivate the BWP when it is determined that all CORESETs included in the BWP are deactivated. In some embodiments, if the frequency location of a CORESET is confined within the BWP, the DRX operation of the CORESET follows the overall DRX operation of the BWP. In addition to the timer based method, the CORESET is able to be activated/deactivated by RRC signaling or DCI based dynamic signaling.

Figure 4:
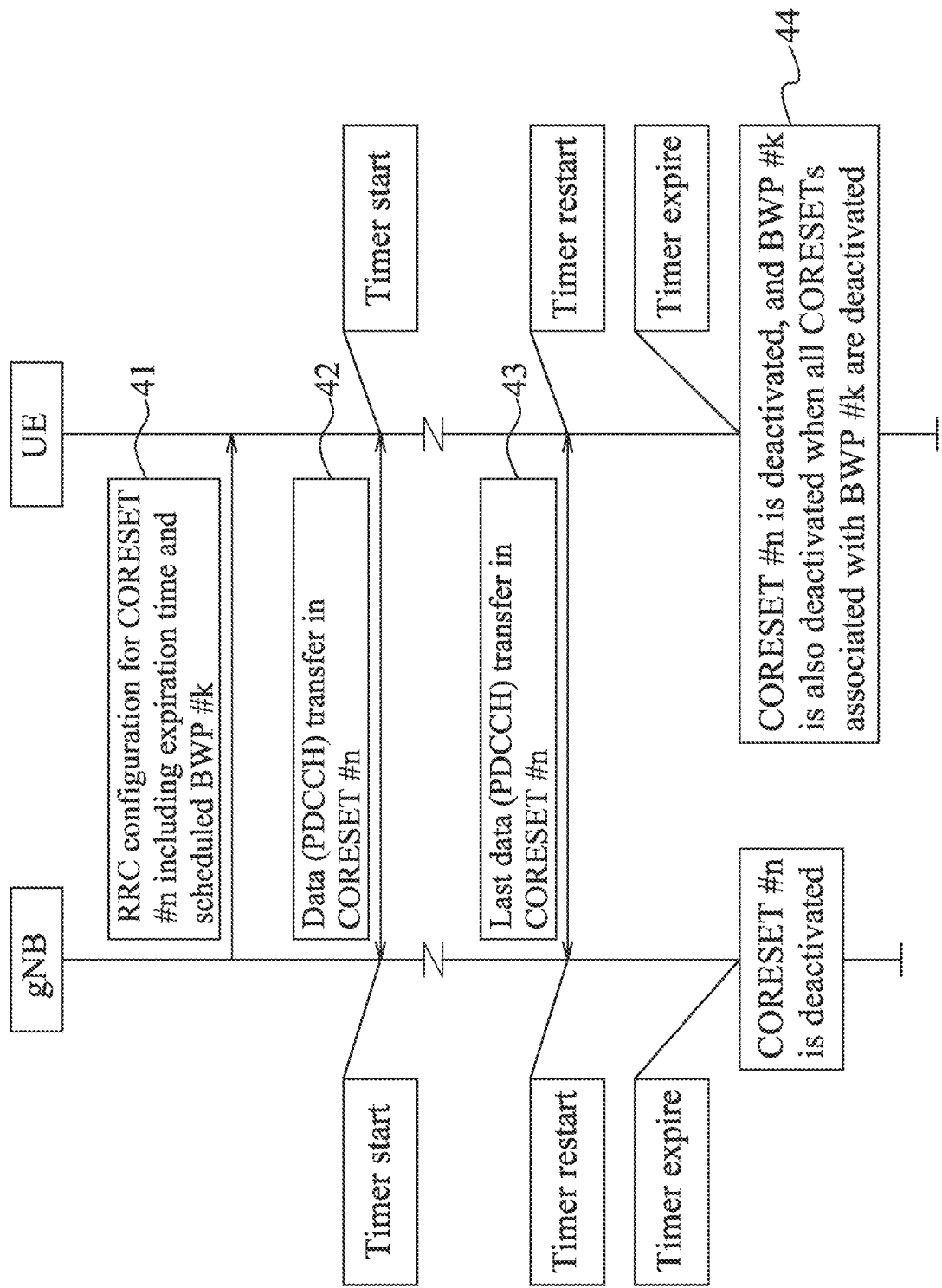
FIG. 4 illustrates a flow chart of another method for timer-based activation/deactivation of BWP according to some embodiments of this disclosure, where the timer is associated with CORESET configuration.

FIG. 4 illustrates an embodiment of the method for timer-based activation/deactivation of BWP which is similar to the embodiment of the method illustrated in FIG. 3. In this embodiment, triggering of a timer for a CORESET is initiated by detection of an event by the UE, rather than being initiated by the gNB as in the embodiment illustrated in FIG. 3.

In block 41, a timer for a certain CORESET (such as the CORESET numbered "n" as shown in FIG. 4) is configured by the RRC CORESET configuration message.

In block 42, after the CORESET is configured and activated, whenever data, e.g., PDCCH content, is transmitted in the CORESET, the timer for the CORESET is triggered (i.e., started). Specifically, the one or more processors of the baseband circuitry of the apparatus of UE are to trigger the timer for the CORESET in response to detection of an event that there is data transmission in the CORESET. The data transmitted is exemplified as PDCCH content.

In block 43, whenever there is some PDCCH content transmitted in the CORESET, the timers for the CORESET at both the sides of gNB and UE are restarted. Specifically, the one or more processors of the baseband circuitry of the apparatus of UE are to restart the timer when it is determined that there is data transmission in the CORESET before the timer expires.

In block 44, when there is a continuous time period during which no PDCCH content is transmitted in the CORESET, so that the timer for the CORESET expires, the CORESET is deactivated at both sides of gNB and UE. Specifically, the one or more processors of the baseband circuitry of the apparatus of UE are to deactivate the CORESET when it is determined that there is no data transmission in the CORESET before the timer expires. In some embodiments, the one or more processors of the baseband circuitry of the apparatus of UE are to deactivate the BWP when it is determined that all CORESETs included in the BWP are deactivated.

Secondary Cell (SCell) Center Frequency and Bandwidth (BW) Configuration

NR supports flexible network operation tailored to each UE having different RF capability, i.e., simultaneously operating as wideband carrier for some UEs and, at the same time, as intra-band carrier aggregation (CA) for some other UEs. As a result, the notion of carrier in NR is rather UE-specific than cell-specific in Long-Term Evolution (LTE) and therefore, the carrier definition from network perspective (i.e., from the perspective of an access node) is not necessarily the same as the carrier definition from UE perspective (i.e., from a perspective of a UE).

In LTE, for SCell configuration, a UE will be RRC signaled on information regarding the carrier, i.e., the absolute radio-frequency channel number (ARFCN) and the bandwidth. In NR, due to the UE-specific carrier concept, the LTE method of SCell configuration is not directly applicable.

Therefore, an approach to notifying a UE of the carrier is proposed in this disclosure. In an embodiment, an apparatus of a radio access network (RAN) node includes baseband circuitry that includes one or more processors and an RF interface. The one or more processors of the baseband circuitry of the apparatus of a RAN node are to generate, for SCell configuration, data that contain information regarding a carrier signal to be specifically allocated to a UE for informing the UE about a center frequency and a bandwidth of the carrier signal. The RF interface is to receive the data from the one or more processors.

In some embodiments, the one or more processors of the baseband circuitry of the apparatus of a RAN node are to generate the data to contain the information including: a center frequency from a perspective of the RAN node; an offset from the center frequency from the perspective of the RAN node to a center frequency from a perspective of the UE; and a bandwidth of the carrier signal from the perspective of the UE.

In some embodiments, the one or more processors of the baseband circuitry of the apparatus of a RAN node are to generate the data to contain the information including: a center frequency from a perspective of the RAN node; and two offsets from the center frequency to respective ends of the carrier signal from a perspective of the UE.

In some embodiments, the one or more processors of the baseband circuitry of the RAN node are to generate the data to contain the information including: a center frequency from a perspective of the UE; and a bandwidth of the carrier signal from the perspective of the UE.

Common Physical Resource Block (PRB) Index Offset Signaling for SCell without Synchronization Signal Block (SSB)

Figure 5:
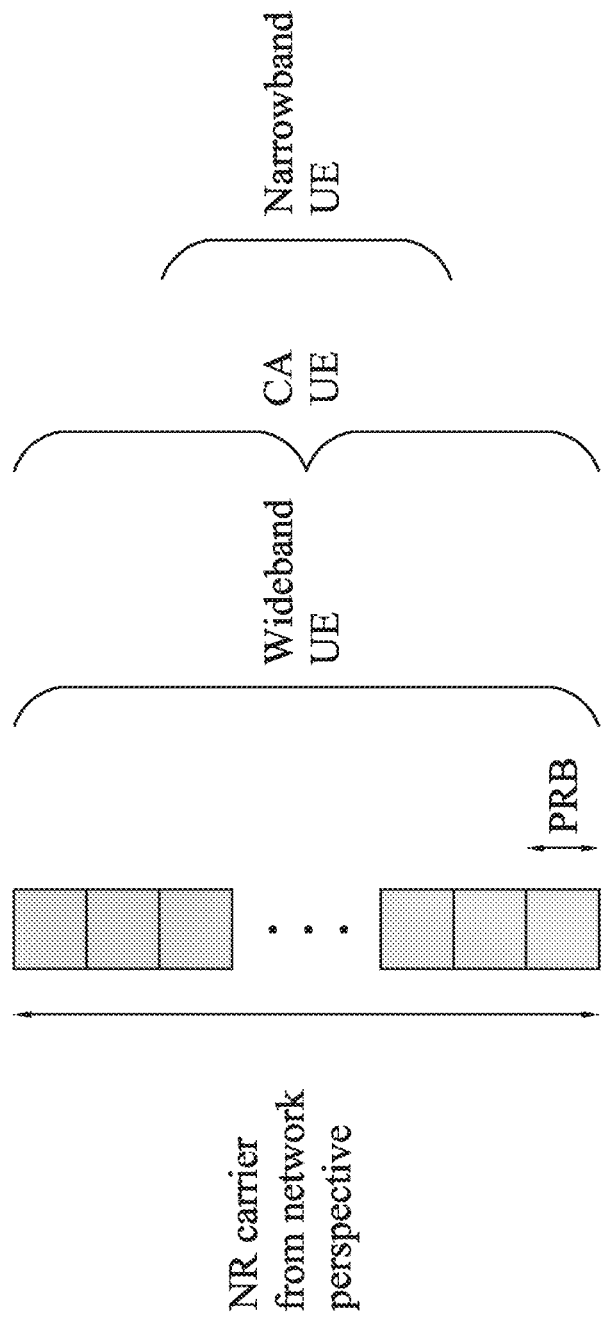
FIG. 5 illustrates an example of a wideband NR carrier from a network perspective according to some embodiments of this disclosure, where wideband UEs, CA UEs, and narrowband UEs coexist.

Referring to FIG. 5, in a given wideband NR carrier from a network perspective, wideband UEs, CA UEs, and narrowband UEs, depending on their RF implementation, can coexist. Therefore, different from LTE, which only supports cell-specific indexing common to all UEs, special handling is necessary for NR.

Accordingly, it is desirable for NR to support both common PRB indexing and UE-specific PRB indexing. The UE-specific PRB indexing is indexed for different BWPs with respect to the configured subcarrier spacing (SCS) for the configured frequency range of an active BWP, i.e., the BWP that is activated. The UE-specific PRB indexing may be used for scheduling a UE-specific PDSCH. On the other hand, the common PRB indexing is common to all the UEs sharing a wideband component carrier (CC) from a network perspective regardless of whether the UEs are wideband, CA, or narrowband UEs. The expected usage of the common PRB indexing is for scheduling a group common PDSCH, reference signal (RS) sequence generation and reception, and BWP configuration, etc.

Figure 6:
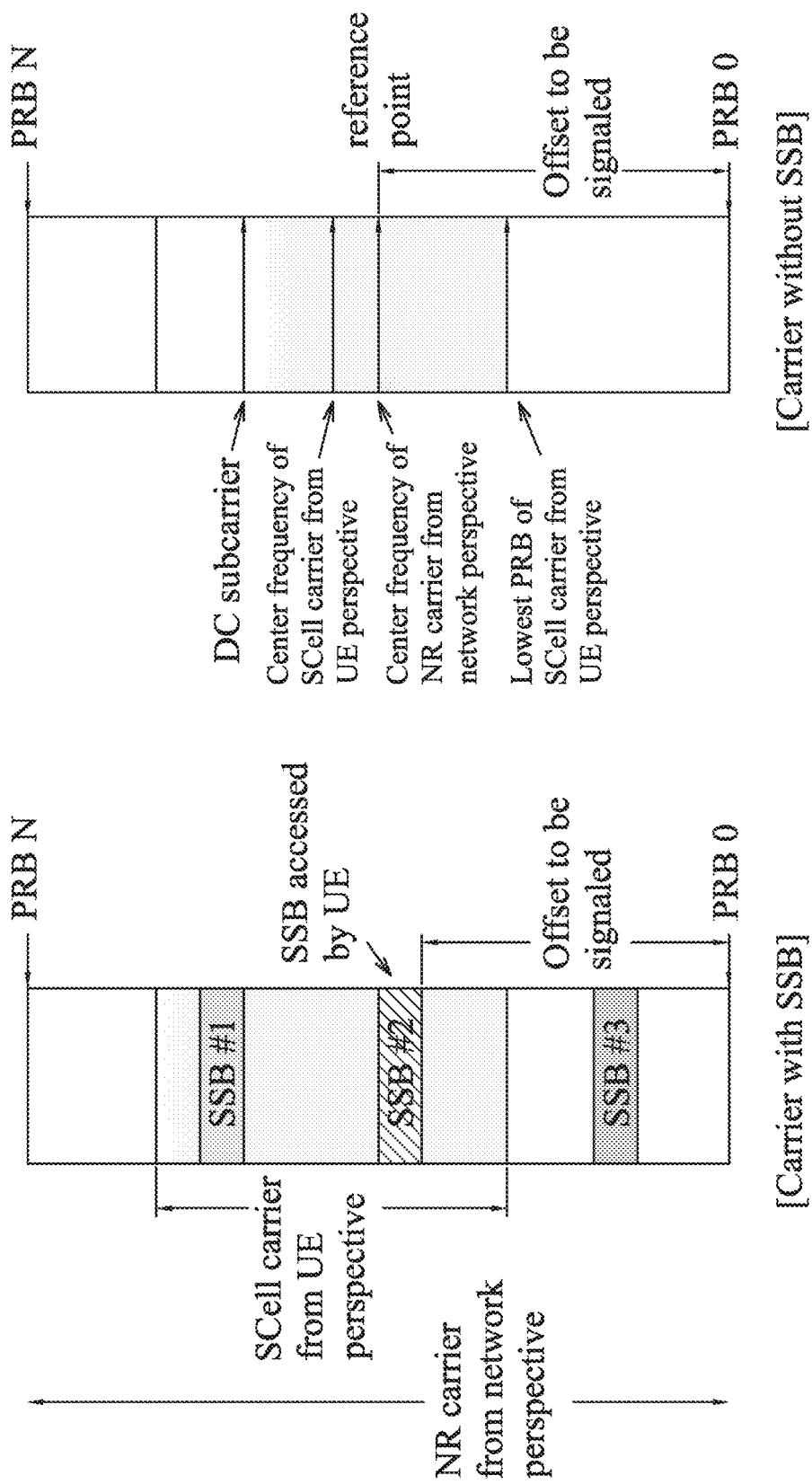
FIG. 6 illustrates an example of common physical resource block (PRB) index offset signaling for secondary cell (SCell) with or without synchronization signal block (SSB) according to some embodiments of this disclosure.

Referring to the left-hand-side of FIG. 6, for the SCell with SSB, a reference PRB for common PRB indexing is PRB 0, which is common to all the UEs sharing a wideband CC from the network perspective. An offset from PRB 0 to the lowest PRB of the SSB accessed by the UE is configured by high layer signaling.

On the other hand, referring to the right-hand-side of FIG. 6, since no SSB is present in this scenario, the offset signaling with respect to the SSB, which originally serves as a reference point, is not feasible. Therefore, an approach of signaling the common PRB index offset for a SCell without SSB is proposed in this disclosure. In some embodiments, an apparatus of UE for common PRB indexing includes baseband circuitry that includes an RF interface, and one or more processors. The one or more processors are to, for a SCell carrier without an SSB, receive, from the RF interface, data that indicate an offset between a reference point and a lowest subcarrier of a reference PRB. The reference PRB is a lowest PRB of a carrier from the perspective of an access node (i.e., the NR carrier from the network perspective) that allocates the SCell carrier to the apparatus. The one or more processors are to configure data transmission with the access node according to the offset indicated by the data. Several options for the reference points are proposed below.

In some embodiments, the reference point is a lowest PRB of the SCell carrier from the perspective of the apparatus of UE for common PRB indexing (i.e., the SCell carrier from UE perspective). In some embodiments, the reference point is a PRB containing the center frequency of the carrier from the perspective of the access node, i.e., the ARFCN. In some embodiments, the reference point is a PRB containing the center frequency of the SCell carrier from the perspective of the apparatus. In some embodiments, the reference point is a PRB containing the DC (direct current) subcarrier.

In some embodiments, the reference point is a position of a virtual SSB which is not physically present in the SCell carrier from the perspective of the apparatus of UE for common PRB indexing. The position of the virtual SSB is a hypothetical position anywhere within the bandwidth of the SCell carrier from the perspective of the apparatus. In some embodiments, the virtual SSB is a lowest PRB within the SCell carrier from the perspective of the apparatus. The common PRB offset signaling follows the same procedure defined for the scenario of SCell with SSB.

Association of DL BWP and UL BWP

Figure 7:
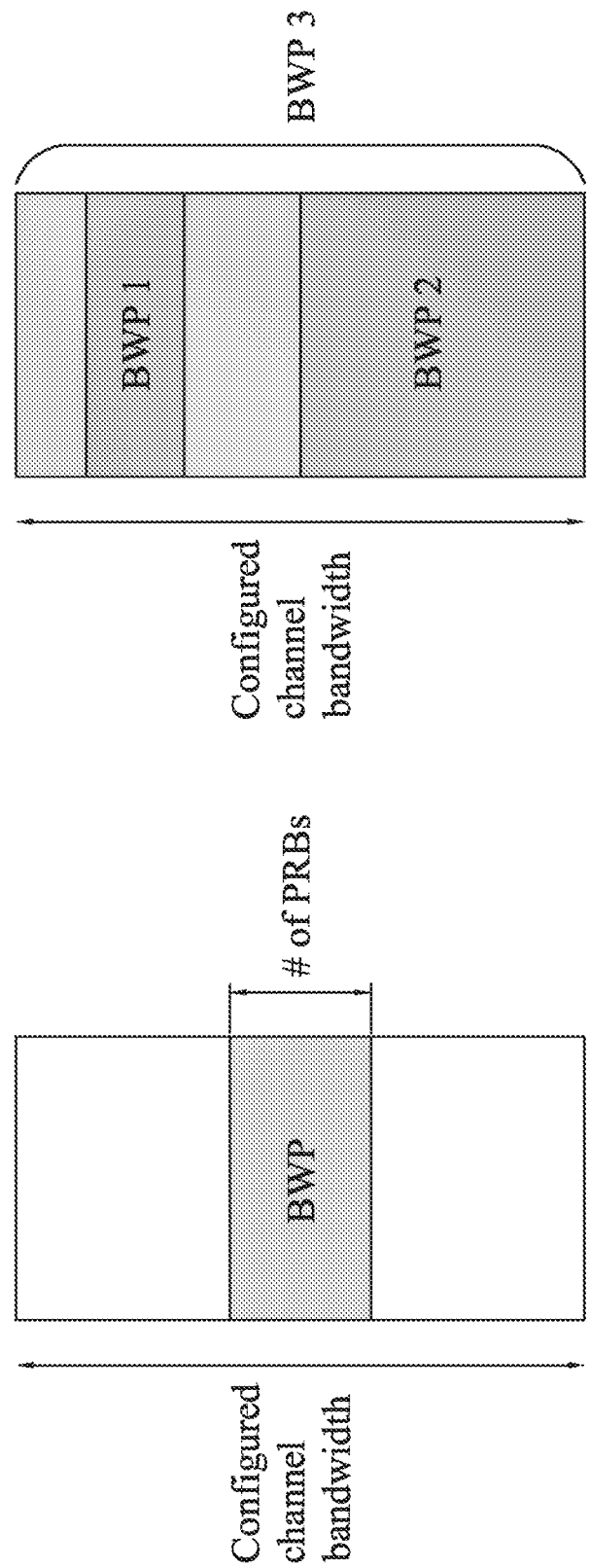
FIG. 7 illustrates an example of multiple configured BWPs in a UE which overlap in frequency according to some embodiments of this disclosure.

As illustrated in FIG. 7, an access node is able to configure multiple BWPs to a UE via RRC signaling, and the multiple BWPs may overlap in frequency. The granularity of bandwidth configuration is one PRB.

In the case of time-division duplexing (TDD), a UE is not expected to retune the center frequency and the bandwidth of a channel between DL and UL data transmission. It is noted that the RF is shared between DL and UL in TDD and, thus, it is impractical for a UE to retune the RF bandwidth for every alternating DL-to-UL and UL-to-DL switching. Thus, practically, there is an appropriate association between a DL BWP and a UL BWP. Moreover, making an association between the DL BWP and the UL BWP will allow one activation/deactivation command to switch both the DL BWP and the UL BWP at once. Otherwise, separate BWP switching commands will be necessary In the case of frequency-division duplexing (FDD), since the RF chain for DL and the RF chain for UL are separate, there is no strong demand to make an association between a DL BWP and a UL BWP. However, with the association, it is still beneficial since one activation/deactivation command can switch both DL and UL BWPs. Also, to preserve the maximum commonality between TDD and FDD design, e.g., DCI, it is proposed to make an association between a DL BWP and a UL BWP.

In some embodiments, an apparatus of user equipment (UE) includes baseband circuitry that includes a radio frequency (RF) interface and one or more processors. The one or more processors are to, when there is an association between a DL BWP and a UP BWP, receive, from the RF interface, data containing DCI that indicates a BWP configuration identifier (ID). The one or more processors then switch both the DL BWP and the UL BWP to a BWP corresponding to the BWP configuration ID. In some embodiments, a format of the DCI is one of DL grant and UL grant.

On the other hand, in some embodiments, the one or more processors of the baseband circuitry of the apparatus of UE are to receive from the RF interface, when there is no association between the DL BWP and the UL BWP, data containing the DCI for DL BWP switching that indicates a DL BWP configuration ID. The one or more processors then switch the DL BWP to another DL BWP corresponding to the DL BWP configuration ID indicated by the DCI. In some embodiments, the DCI for DL BWP switching is a DL grant scheduling DCI.

Further, in some embodiments, the one or more processors of the baseband circuitry of the apparatus of UE are to receive from the RF interface, when there is no association between the DL BWP and the UL BWP, data containing the DCI for UL BWP switching that indicates a UL BWP configuration ID. The one or more processors then switch the UL BWP to another UL BWP corresponding to the UP BWP configuration ID indicated by the DCI. In some embodiments, the DCI for UL BWP switching is a UL grant scheduling DCI.

In some embodiments, there is an association between a DL BWP and a UL BWP for a TDD carrier, and there is no association between a DL BWP and a UL BWP for an FDD carrier.

BWP Activation/Deactivation Via DCI without Resource Allocation

When it is desired for an access node to expand a UE's bandwidth, it will be the case that the access node attempts to schedule data to be transmitted to the UE. Therefore, a BWP switching command will come with scheduling through resource allocation. On the other hand, when it is desired for the access node to shrink a UE's bandwidth, it will be the case that there is no data to be scheduled to be directed to the UE. In such cases, the UE can be switched to a default BWP using the aforementioned timer based BWP activation/deactivation mechanism. However, having capability of BWP switching only and without scheduling will allow more controllability to the network.

As a result, an apparatus of UE is proposed to support BWP switching without scheduling. In some embodiments, the apparatus includes baseband circuitry that includes an RF interface and one or more processors. The one or more processors are to receive, from the RF interface, data containing a bit indicator that indicates BWP switching only. The one or more processors then switch a current BWP to another BWP. Specifically, the data received by the one or more processors of the baseband circuitry is DCI, and the bit indicator is an expression of a bit field in the DCI serving the purpose of BWP switching only. In some embodiments, the bit field in the DCI includes one of resource block (RB) assignment bits, modulation and coding scheme (MCS) bits, a hybrid automatic repeat request (HARQ) process number, etc.

BWP ID

A UE is RRC configured on the set of BWPs that the UE can be potentially activated with. In some embodiments, an apparatus of UE includes baseband circuitry that includes an RF interface and one or more processors. The one or more processors are to receive, from the RF interface, RRC configuration data that indicate a set of BWPs. The one or more processors then configure, according to the RRC configuration data, the set of BWPs, in which a BWP is to be activated for data transmission with an access node.

In some embodiments, a total number of BWPs in the set of BWPs indicated by the RRC configuration data is fixed to an integer number K. The number K can be fixed in the specification. The BWPs have respective BWP identifiers (IDs) ranging from 1 to K, and a total of log 2 K bits are used to express the BWP IDs.

Alternatively, the access node can configure, through RRC signaling, the range of the BWP IDs to K', so the number of configured BWPs in a UE through the RRC signaling does not exceed K'. Accordingly, in some embodiments, the RRC configuration data further indicate a range of configurable BWP IDs, and the range is an integer number K'. The number of BWPs in the set of BWPs configured by the one or more processor does not exceed the integer number K', and a total of log 2 K' bits are used to express the BWP IDs.

DCI Design for BWP Activation and Deactivation

Since it is agreed that NR supports activation/deactivation of DL and UL BWPs by explicit indication at least in downlink control information (DCI), different types of DCI are proposed in this disclosure for controlling activation and deactivation of BWPs. In some embodiments, an apparatus of UE includes a baseband circuitry that includes an RF interface and one or more processors. The one or more processors are to receive, from the RF interface, DCI including a BWP activation command (or a BWP deactivation command) and a BWP ID. The one or more processors then activate (or deactivate) a BWP corresponding to the BWP ID.

In some embodiments, the DCI is a scheduling DCI which describes resource allocation (RA), the description of the RA including the BWP ID. The scheduling DCI includes a plurality of BWP IDs for activation of a plurality of BWPs. In this case, the BWP IDs of the scheduling DCI are indicated by a bitmap. In some embodiments, the scheduling DCI includes both a UL BWP ID and a DL BWP ID. In some embodiments, the scheduling DCI includes a DL BWP ID only or a UL BWP ID only.

Alternatively, a separate DCI other than the scheduling DCI is used for the dedicated purpose of BWP activation/deactivation. The separate DCI has merit in the sense that the DCI can be designed to be more robust because it will contain fewer information bits. Considering that the BWP switching command is expected to have high reliability, this merit is important. Accordingly, in some embodiments, the DCI is a separate BWP activation DCI (or a separate BWP deactivation DCI) which is used for a dedicated purpose of BWP activation (or BWP deactivation) and which includes the BWP ID corresponding to the BWP expected to be activated (or deactivated). If the separate BWP activation DCI includes only one BWP ID, the one or more processors of the baseband circuitry are to receive, from the RF interface, a scheduling DCI which does not indicate the BWP ID corresponding to the BWP to be scheduled for data transmission.

In some embodiments, the separate BWP activation DCI (or separate BWP deactivation DCI) includes a plurality of BWP IDs for activation (or deactivation) of a plurality of BWPs. In this case, the BWP IDs of the separate BWP activation DCI (or separate BWP deactivation DCI) are indicated by a bitmap. The one or more processors of the baseband circuitry are to receive, from the RF interface, a scheduling DCI which indicates one of the BWP IDs corresponding to one of the BWPs to be scheduled for data transmission.

In some embodiments, the separate BWP activation DCI includes a timer value for timer-based BWP switching. The timer value is exemplified by an expiration time of a timer, and may be different than what is configured through RRC signaling. In some embodiments, the separate BWP activation DCI includes time provisioned for RF switching. In some embodiments, the separate BWP activation DCI (or separate BWP deactivation DCI) is used for both UL BWP activation and DL BWP activation (or both UL BWP deactivation and DL BWP deactivation). In some embodiments, the separate BWP activation DCI (or separate BWP deactivation DCI) is used for both UL BWP activation and DL BWP activation (or both UL BWP deactivation and DL BWP deactivation). In some embodiments, the separate BWP activation DCI (or separate BWP deactivation DCI) is used for UL BWP activation only (or UL BWP deactivation only), and another separate BWP activation DCI (or another separate BWP deactivation DCI) is used for DL BWP activation only (or DL BWP deactivation only).

In some embodiments, activation (or deactivation) of the BWP is within a configured carrier and does not span over different carriers. In some embodiments, the BWP activation for DL and UL can be done in a paired manner, so only one configuration ID indication is included in the DCI. In another embodiment, the BWP activation for DL is independent from the BWP activation for UL.

DCI Design for Cross-BWP Scheduling

When there is a BWP switching, a DCI in a current BWP is supposed to express resource allocation (RA) in the next BWP that the UE is expected to switch from the current BWP to. Based on an NR design, the RA will be based on the UE-specific PRB indexing, which is dedicated to different BWPs. This means that the range of the PRB indices will change as the BWP changes. Note that the DCI to be transmitted in the current BWP will be based on the PRB indexing for the current BWP, but that DCI is supposed to express the RA in the new BWP, which arouses conflict.

Therefore, a DCI design for cross-BWP scheduling is proposed in this disclosure to address the aforementioned issue. In some embodiments, an apparatus of UE for cross-BWP scheduling includes baseband circuitry that includes an RF interface and one or more processors. The one or more processors are to receive, from the RF interface, DCI that indicates RA in a next BWP, wherein the apparatus is expected to switch from a current BWP to the next BWP. A size of a bit field for describing the RA in the DCI is fixed and does not change for different BWPs, implying that a total bit size for the DCI is fixed and does not change for different BWPs. Furthermore, used bits among the bit field for describing the RA are dependent on the current BWP and the next BWP.

In one example of these embodiments, there are N bits allocated for RA type 0 allocation which is the largest number demanded considering the largest supported bandwidth of the BWP by specification and considering the resource block group (RBG) size. If a small BWP is used, such as a BWP only having n RBGs in it, then only the first n bits in a total-N-bit field for RA are valid information to be interpreted by a UE. In other words, the size of the bit field for describing the RA in the DCI is N bits and is associated with a largest supported bandwidth of a BWP, and the one or more processors of the baseband circuitry of the apparatus of UE for cross-BWP scheduling are to, for the next BWP having a smaller bandwidth, interpret the first n bits in the bit field for describing the RA indicated by the DCI, where n is an integer smaller than N. Similar examples are considered for other RA types, e.g., type 1 and type 2.

In some embodiments, an NR system uses the same bit field size for RA. Regardless of whether a scheduling DCI is used or separate DCI for BWP activation (separate BWP activation DCI) is used, the UE is supposed to know the BWP ID that the current DCI is scheduling. Otherwise, the UE may not interpret the bit field for RA. In other words, implicit BWP switching via RA without explicit BWP ID signaling may not work. Specifically, the one or more processors of the baseband circuitry of the UE for cross-BWP scheduling are to determine a BWP ID of the next BWP.

In another embodiment, the bit field size for RA in DCI is variable and does change for different BWPs. This also implies that the total DCI bit size for a given DCI type changes for different BWPs. This approach may increase blind decoding overhead for the UEs.

Figure 8:
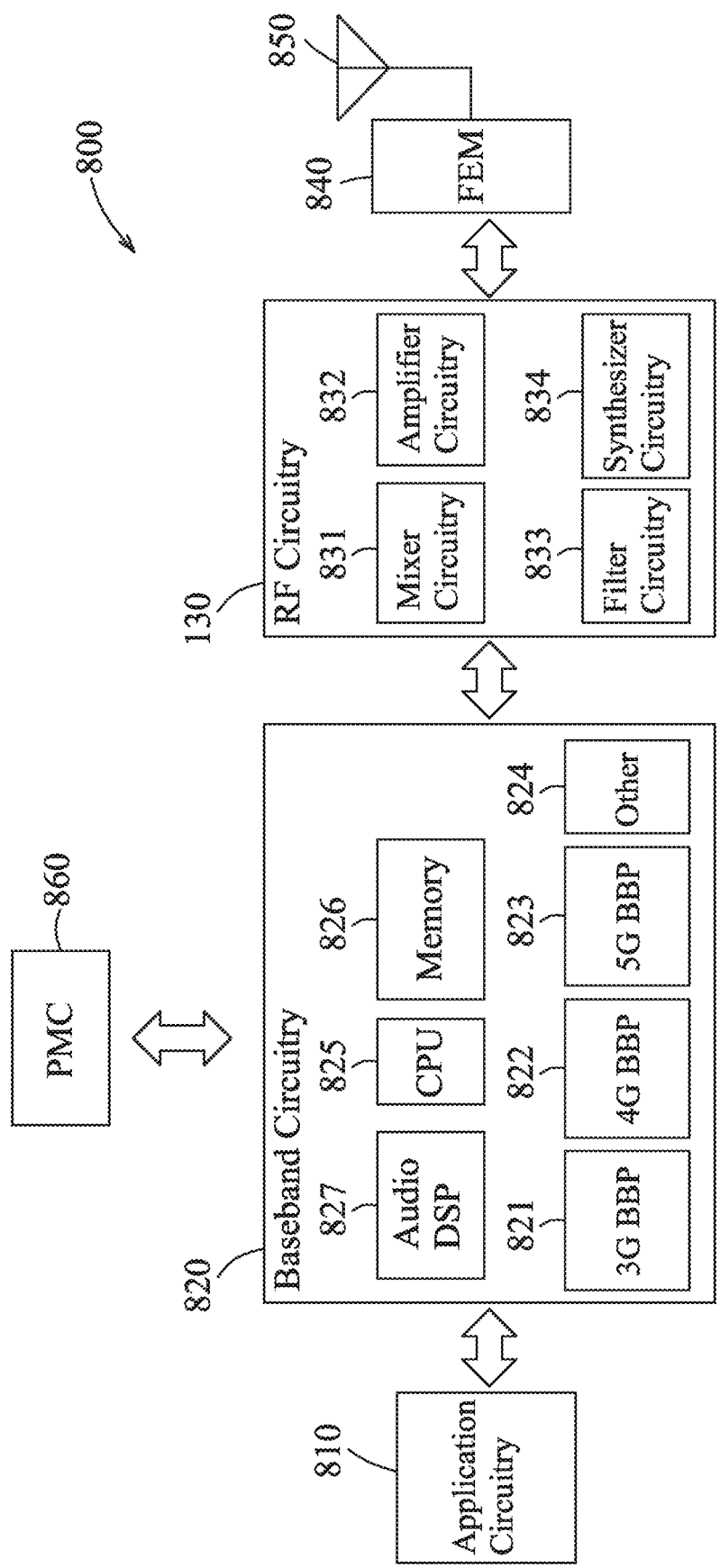
FIG. 8 is a schematic block diagram illustrating an apparatus according to some embodiments of this disclosure.

FIG. 8 illustrates an example of an apparatus 800 in accordance with some embodiments of this disclosure. For example, the apparatus 800 may be included in a user equipment (UE) or a radio access network (RAN) node. In this embodiment, the apparatus 800 includes application circuitry 810, baseband circuitry 820, radio frequency (RF) circuitry 830, front-end module (FEM) circuitry 840, one or more antennas 850 (only one is depicted) and power management circuitry (PMC) 860. In some embodiments, the apparatus 800 may include fewer components. For example, a RAN node may not include the application circuitry 810, and instead may include a processor/controller to process Internet-Protocol (IP) data received from an evolved packet core (EPC) network. In other embodiments, the apparatus 800 may include additional components, for example, a memory/storage device, a display, a camera, a sensor or an input/output (I/O) interface. In some embodiments, the above-mentioned components may be included in more than one device. For example, in order to implement a Cloud-RAN architecture, the above-mentioned circuitries may be separated and included in two or more devices in the Cloud-RAN architecture.

The application circuitry 810 may include one or more application processors. For example, the application circuitry 810 may include, but is not limited to, one or more single-core or multi-core processors. The processors may include any combination of general-purpose processors and dedicated processors (e.g., graphics processors, application processors, etc.). The processors may be coupled to or include a memory/storage module, and may be configured to execute instructions stored in the memory/storage module to enable various applications or operating systems to run on the apparatus 800. In some embodiments, the processors of the application circuitry 810 may process IP data packets received from an EPC network.

In some embodiments, the baseband circuitry 820 may provide for communication compatible with one or more radio technologies. For example, in some embodiments, the baseband circuitry 820 may support communication with an evolved universal terrestrial radio access network (EUTRAN) or other wireless metropolitan area networks (WMAN), a wireless local area network (WLAN), or a wireless personal area network (WPAN). In some embodiments where the baseband circuitry 820 is configured to support radio communication using more than one wireless protocol, the baseband circuitry 820 may be referred to as a multi-mode baseband circuitry.

The baseband circuitry 820 may include, but is not limited to, one or more single-core or multi-core processors. The baseband circuitry 820 may include one or more baseband processors or control logic to process baseband signals received from the RF circuitry 830, and to generate baseband signals to be transmitted to the RF circuitry 830. The baseband circuitry 820 may interface and communicate with the application circuitry 810 for generation and processing of the baseband signals and for controlling operations of the RF circuitry 830.

In some embodiments, the baseband circuitry 820 may include a third generation (3G) baseband processor (3G BBP) 821, a fourth generation (4G) baseband processor (4G BBP) 822, a fifth generation (5G) baseband processor (5G BBP) 823 and other baseband processor(s) 824 for other existing generations, generations in development or to be developed in the future (e.g., second generation (2G), sixth generation (6G), etc.). The baseband processors 821-824 of the baseband circuitry 820 are configured to handle various radio control functions that enable communication with one or more radio networks via the RF circuitry 830. In other embodiments, the baseband circuitry 820 may further include a central processing unit (CPU) 825 and a memory 826, and some or all functionality (e.g., the radio control functions) of the baseband processors 821-824 may be implemented as software modules that are stored in the memory 826 and executed by the CPU 825 to carry out the functionality. The radio control functions of the baseband processors 821-824 may include, but are not limited to, signal modulation/demodulation, encoding/decoding, radio frequency shifting, etc. In some embodiments, the signal modulation/demodulation includes Fast-Fourier Transform (FFT), pre-coding or constellation mapping/de-mapping. In some embodiments, the encoding/decoding includes convolution, tail-biting convolution, turbo, Viterbi, or Low Density Parity Check (LDPC) encoding/decoding. Embodiments of the signal modulation/demodulation and the encoding/decoding are not limited to these examples and may include other suitable operations in other embodiments. In some embodiments, the baseband circuitry 820 may further include an audio digital signal processor (DSP) 827 for compression/decompression and echo cancellation.

In some embodiments, the components of the baseband circuitry 820 may be integrated as a single chip or a single chipset, or may be disposed on a single circuit board. In some embodiments, some or all of the constituent components of the baseband circuitry 820 and the application circuitry 810 may be integrated as, for example, a system on chip (SoC).

The RF circuitry 830 is configured to enable communication with wireless networks using modulated electromagnetic radiation through a non-solid medium. In various embodiments, the RF circuitry 830 may include switches, filters, amplifiers, etc., to facilitate communication with the wireless network. The RF circuitry 830 may include a receive signal path that includes circuitry to down-convert RF signals received from the FEM circuitry 840 and to provide the baseband signals to the baseband circuitry 820. The RF circuitry 830 may further include a transmit signal path that includes circuitry to up-convert the baseband signals provided by the baseband circuitry 820 and to provide RF output signals to the FEM circuitry 840 for transmission.

In some embodiments, the receive signal path of the RF circuitry 830 may include mixer circuitry 831, amplifier circuitry 832 and filter circuitry 833. In some embodiments, the transmit signal path of the RF circuitry 830 may include filter circuitry 833 and mixer circuitry 831. The RF circuitry 830 may also include synthesizer circuitry 834 for synthesizing a frequency for use by the mixer circuitry 831 of the receive signal path and/or the transmit signal path.

For the receive signal path, in some embodiments, the mixer circuitry 831 may be configured to down-convert RF signals received from the FEM circuitry 840 based on the synthesized frequency provided by synthesizer circuitry 834. The amplifier circuitry 832 may be configured to amplify the down-converted signals. The filter circuitry 833 may be a low-pass filter (LPF) or a band-pass filter (BPF) configured to remove unwanted signals from the down-converted signals to generate output baseband signals. The output baseband signals may be provided to the baseband circuitry 820 for further processing. In some embodiments, the output baseband signals may be zero-frequency baseband signals, although this is not a requirement. In some embodiments, the mixer circuitry 831 of the receive signal path may include passive mixers, although the scope of the embodiments is not limited in this respect.

As for the transmit signal path, in some embodiments, the mixer circuitry 831 may be configured to up-convert input baseband signals based on the synthesized frequency provided by the synthesizer circuitry 834 to generate the RF output signals for the FEM circuitry 840. The input baseband signals may be provided by the baseband circuitry 820, and may be filtered by the filter circuitry 833.

In some embodiments, the mixer circuitry 831 of the receive signal path and the mixer circuitry 831 of the transmit signal path may include two or more mixers and may be arranged for quadrature down-conversion in the receive signal path and for quadrature up-conversion in the transmit signal path. In some embodiments, the mixer circuitry 831 of the receive signal path and the mixer circuitry 831 of the transmit signal path may include two or more mixers and may be arranged for image rejection (e.g., Hartley image rejection). In some embodiments, the mixer circuitry 831 of the receive signal path and the mixer circuitry 831 of the transmit signal path may be arranged for direct down-conversion and direct up-conversion, respectively. In some embodiments, the mixer circuitry 831 of the receive signal path and the mixer circuitry 831 of the transmit signal path may be configured for super-heterodyne operation.

In some embodiments, the output baseband signals and the input baseband signals may be analog baseband signals, although the scope of the embodiments is not limited in this respect. In alternative embodiments, the output baseband signals and the input baseband signals may be digital baseband signals. In such alternative embodiments, the RF circuitry 830 may further include analog-to-digital converter (ADC) circuitry and digital-to-analog converter (DAC) circuitry, and the baseband circuitry 820 may include a digital baseband interface to communicate with the RF circuitry 830.

In some dual-mode embodiments, a separate radio IC circuitry may be provided for processing signals for each spectrum, although the scope of the embodiments is not limited in this respect.

In some embodiments, the synthesizer circuitry 834 may be a fractional-N synthesizer or a fractional N/N+1 synthesizer, although the scope of the embodiments is not limited in this respect as other types of frequency synthesizers may be suitable. For example, the synthesizer circuitry 834 may be a delta-sigma synthesizer, a frequency multiplier, or a synthesizer comprising a phase-locked loop with a frequency divider in other embodiments.

The synthesizer circuitry 834 may be configured to synthesize an output frequency for use by the mixer circuitry 831 of the RF circuitry 830 based on a frequency input and a divider control input. In some embodiments, the frequency input may be provided by a voltage controlled oscillator (VCO), although that is not a requirement. In some embodiments, the divider control input may be provided by either the baseband circuitry 820 or the application circuitry 810 depending on the desired output frequency. In some embodiments, the divider control input (e.g., N) may be determined according to a look-up table based on a channel indicated by the application circuitry 810.

The synthesizer circuitry 834 of the RF circuitry 830 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide an input signal by either N or N+1 (e.g., based on a carry out) to provide a fractional division ratio. In some embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is a number of the delay elements in the delay line. In this way, the DLL provides negative feedback to help ensure that the total delay through the delay line is one VCO cycle.

In some embodiments, the synthesizer circuitry 834 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 830 may include an IQ/polar converter.

The FEM circuitry 840 may include a receive signal path that includes circuitry configured to operate on RF signals received from the one or more antennas 850, to amplify the received RF signals and to provide amplified versions of the received RF signals to the RF circuitry 830 for further processing. The FEM circuitry 840 may further include a transmit signal path that includes circuitry configured to amplify signals provided by the RF circuitry 830 for transmission by one or more of the one or more antennas 850. In various embodiments, the amplification through the transmit or receive signal path may be done solely in the RF circuitry 830, solely in the FEM circuitry 840, or in both the RF circuitry 830 and the FEM circuitry 840.

In some embodiments, the FEM circuitry 840 may include a TX/RX switch to switch between transmit mode operation and receive mode operation. The receive signal path of the FEM circuitry 840 may include a low-noise amplifier (LNA) to amplify the received RF signals and to provide the amplified versions of the received RF signals as an output (e.g., to the RF circuitry 830). The transmit signal path of the FEM circuitry 840 may include a power amplifier (PA) to amplify input RF signals (e.g., provided by the RF circuitry 830), and one or more filters to generate RF signals for subsequent transmission (e.g., by one or more of the one or more antennas 850).

In some embodiments, the PMC 860 is configured to manage power provided to the baseband circuitry 820. In particular, the PMC 860 may control power-source selection, voltage scaling, battery charging, or DC-to-DC conversion. The PMC 860 may often be included in the apparatus 800 when the apparatus 800 is capable of being powered by a battery. For example, when the apparatus 800 is included in a UE, it generally includes the PMC 860. The PMC 860 may increase the power conversion efficiency while providing desirable implementation size and heat dissipation characteristics.

While FIG. 8 shows the PMC 860 being coupled only with the baseband circuitry 820, in other embodiments, the PMC 860 may be additionally or alternatively coupled with, and perform similar power management operations for, other components such as, but not limited to, the application circuitry 810, the RF circuitry 830 or the FEM 840.

In some embodiments, the PMC 860 may control, or otherwise be part of, various power saving mechanisms of the apparatus 800. For example, if the apparatus 800 is in an RRC_Connected state, where it is still connected to the RAN node as it expects to receive traffic shortly, then it may enter a state known as Discontinuous Reception Mode (DRX) after a period of inactivity. During this state, the apparatus 800 may power down for brief intervals of time and thus save power.

If there is no data traffic activity for an extended period of time, then the apparatus 800 may enter an RRC_Idle state, where it disconnects from network and does not perform operations such as channel quality feedback, handover, etc. The apparatus 800 goes into a very low power state and it performs paging where it periodically wakes up to listen to the network and then powers down again. The apparatus 800 may not receive data in this state. In order to receive data, the apparatus 800 transitions back to the RRC_Connected state.

An additional power saving mode may allow a device or apparatus to be unavailable to the network for periods longer than a paging interval (ranging from seconds to a few hours). During this time, the device or apparatus is totally unreachable to the network and may power down completely. Any data sent during this time incurs a large delay and it is assumed the delay is acceptable.

Processors of the application circuitry 810 and processors of the baseband circuitry 820 may be used to execute elements of one or more instances of a protocol stack. For example, processors of the baseband circuitry 820, alone or in combination, may be used to execute Layer 3, Layer 2, or Layer 1 functionality, while processors of the application circuitry 810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
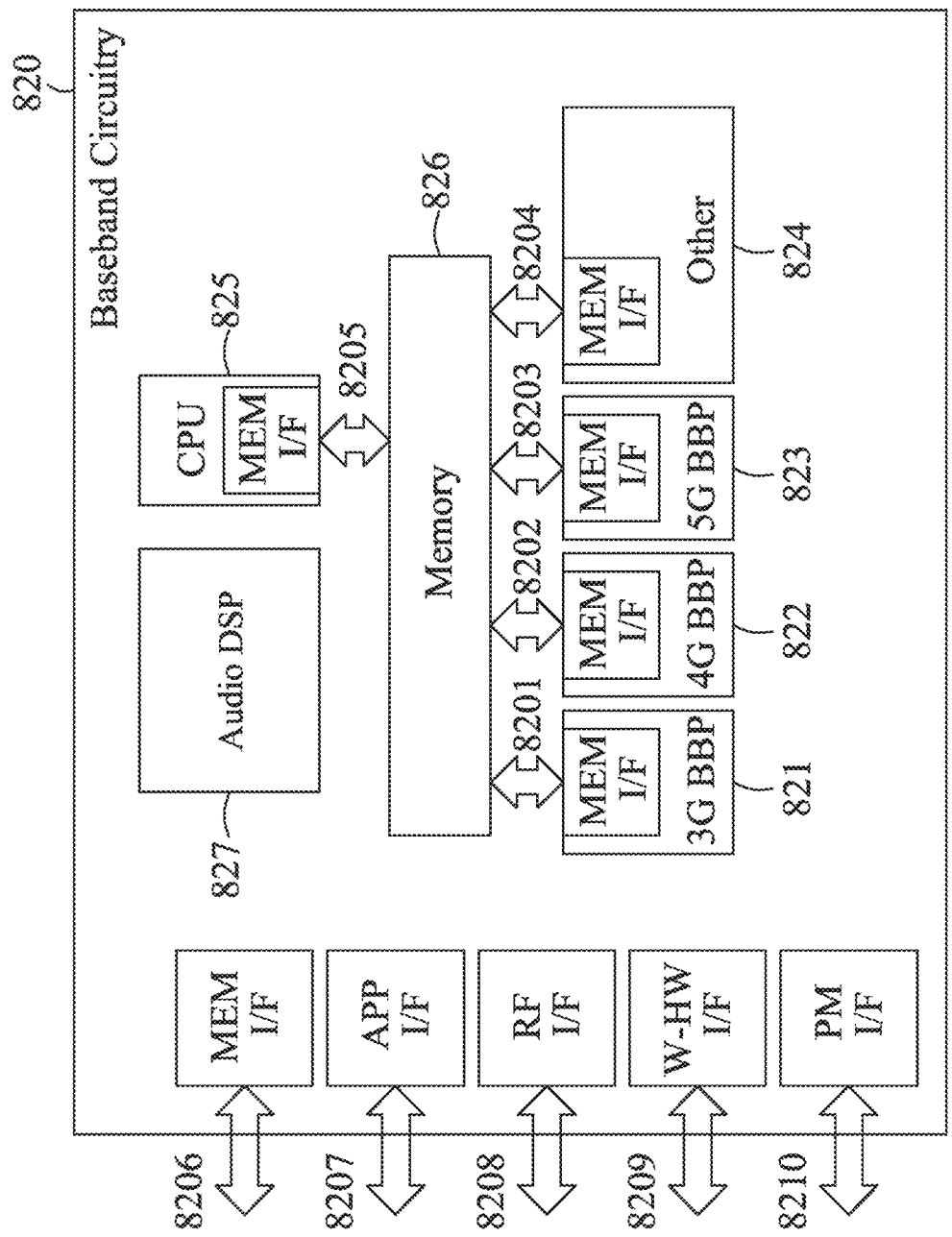
FIG. 9 illustrates example interfaces of baseband circuitry according to some embodiments of this disclosure.

FIG. 9 illustrates example interfaces of baseband circuitry in accordance with some embodiments. As discussed above, the baseband circuitry 820 of FIG. 8 includes various processors (i.e., the baseband processors 821-824 and the CPU 825), and the memory 826 utilized by the processors. Each of the processors 821-825 may include an internal memory interface (MEM I/F) 8201-8205 communicatively coupled to the memory 826 so as to send/receive data to/from the memory 826.

The baseband circuitry 820 may further include one or more interfaces to communicatively couple to other circuitries/devices. The one or more interfaces include, for example, a memory interface (MEM I/F) 8206 (e.g., an interface to send/receive data to/from memory external to the baseband circuitry 820), an application circuitry interface (APP I/F) 8207 (e.g., an interface to send/receive data to/from the application circuitry 810 of FIG. 8), an RF circuitry interface (RF I/F) 8208 (e.g., an interface to send/receive data to/from the RF circuitry 830 of FIG. 8), a wireless hardware connectivity interface (W-HW I/F) 8209 (e.g., an interface to send/receive data to/from Near Field Communication (NFC) components, Bluetooth® components (e.g., Bluetooth® Low Energy), Wi-Fi® components, and/or other communication components), and a power management interface (PM I/F) 8210 (e.g., an interface to send/receive power or control signals to/from the PMC 860 of FIG. 8).

Figure 10:
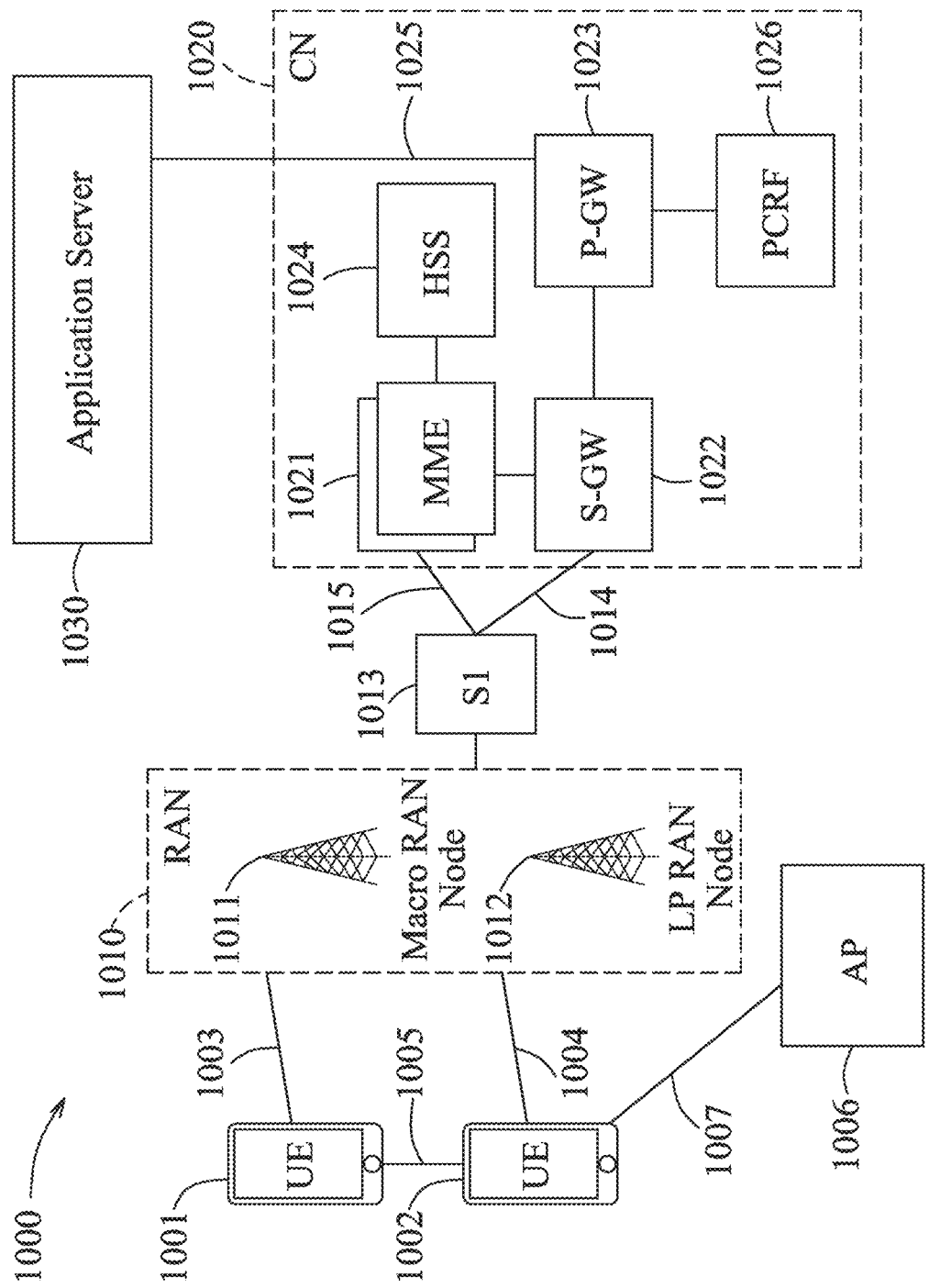
FIG. 10 illustrates an architecture of a system of a network according to some embodiments of this disclosure.

FIG. 10 illustrates an architecture of a system 1000 of a network in accordance with some embodiments of this disclosure. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, at least one of the UEs 1001 and 1002 may be an Internet-of-Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UE may execute background applications (e.g., keep-alive messages, status updates, etc.) to facilitate the connections of the IoT network.

The UEs 1001 and 1002 may be configured to connect, e.g., communicatively couple, with a radio access network (RAN) 1010. The RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively. Each of the connections 1003 and 1004 includes a physical communications interface or layer (discussed in further detail below). In this embodiment, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a ProSe interface 1005. The ProSe interface 1005 may alternatively be referred to as a sidelink interface including one or more logical channels. The one or more logical channels include, but are not limited to, a Physical Sidelink Control Channel (PSCCH), a Physical Sidelink Shared Channel (PSSCH), a Physical Sidelink Discovery Channel (PSDCH) and a Physical Sidelink Broadcast Channel (PSBCH)

The UE 1002 is shown to be configured to access an access point (AP) 1006 via connection 1007. The connection 1007 may include a local wireless connection, such as a connection consistent with any IEEE 802.11 protocol, wherein the AP 1006 may include a wireless fidelity (WiFi®) router. In this example, the AP 1006 is shown to be connected to the Internet without connecting to a core network 1020 of the wireless system 1000 (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In some embodiments, the RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any one of the RAN nodes 1011 and 1012 can terminate the air interface protocol and can be the first point of contact for the UEs 1001 and 1002. In some embodiments, any one of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

According to some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications). It is noted that the scope of the embodiments is not limited in this respect. The OFDM signals may include a plurality of orthogonal subcarriers.

In some embodiments, a downlink resource grid can be used for downlink transmissions from any one of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements, in the frequency domain, this may represent the smallest quantity of resources that can currently be allocated. There are several different physical downlink channels that are conveyed using such resource blocks.

The PDSCH may carry user data and higher-layer signaling to the UEs 1001 and 1002. The PDCCH may carry information about the transport format and resource allocations related to the PDSCH, among other things. The PDCCH may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to a UE within a cell) may be performed at any of the RAN nodes 1011 and 1012 based on channel quality information fed back from any one of the UEs 1001 and 1002. The downlink resource assignment information may be sent on the PDCCH used for (e.g., assigned to) each of the UEs 1001 and 1002.

The PDCCH may use control channel elements (CCEs) to convey the control information. Before being mapped to resource elements, PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). One of the ECCEs may have other numbers of EREGs in some situations.

The RAN 1010 is shown to be communicatively coupled to the core network (CN) 1020 via an S1 interface 1013. In some embodiments, the CN 1020 may be an evolved packet core (EPC) network, a NextGen Packet Core (NPC) network, or some other type of CN. In this embodiment, the S1 interface 1013 is split into two parts, including an S1-U interface 1014 and an S1-mobility management entity (MME) interface 1015. The S1-U interface 1014 carries traffic data between the RAN nodes 1011 and 1012 and a serving gateway (S-GW) 1022. The S1-MME interface 1015 is a signaling interface between the RAN nodes 1011 and 1012 and MMEs 1021.

In this embodiment, the CN 1020 includes the MMEs 1021, the S-GW 1022, a Packet Data Network (PDN) Gateway (P-GW) 1023, and a home subscriber server (HSS) 1024. The MMEs 1021 may be similar in function to the control plane of legacy Serving GPRS (General Packet Radio Service) Support Nodes (SGSNs). The MMEs 1021 may manage mobility aspects in access such as gateway selection and tracking area list management. The HSS 1024 may include a database for network users, including subscription-related information to support the network entities' handling of communication sessions. The CN 1020 may include one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 terminates the S1 interface 1013 towards the RAN 1010, and routes data packets between the RAN 1010 and the CN 1020. In addition, the S-GW 1022 may be a local mobility anchor point for inter-RAN node handovers, and also may provide an anchor for inter-3GPP mobility. Other responsibilities of the S-GW 1022 may include lawful intercept, charging, and some policy enforcement.

The P-GW 1023 terminates an SGi interface toward a PDN. The P-GW 1023 routes data packets between the CN 1020 (e.g., the EPC network) and external networks such as a network including an application server 1030 (alternatively referred to as application function (AF)) via an Internet Protocol (IP) interface 1025. Generally, the application server 1030 may be an element offering applications that use IP bearer resources with the core network 1020 (e.g., UMTS Packet Services (PS) domain, LTE PS data services, etc.). In this embodiment, the P-GW 1023 is shown to be communicatively coupled to the application server 1030 via the IP interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

In some embodiments, the P-GW 1023 may further be a node for policy enforcement and charging data collection. The CN 1020 may further include a policy and charging control element (e.g., Policy and Charging Enforcement Function (PCRF) 1026). In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select appropriate Quality of Service (QoS) and charging parameters. The PCRF 1026 may provision this rule into a Policy and Charging Enforcement Function (PCEF) (not shown) with appropriate traffic flow template (TFT) and QoS class of identifier (QCI), which commences the QoS and charging as specified by the application server 1030.

Figure 11:
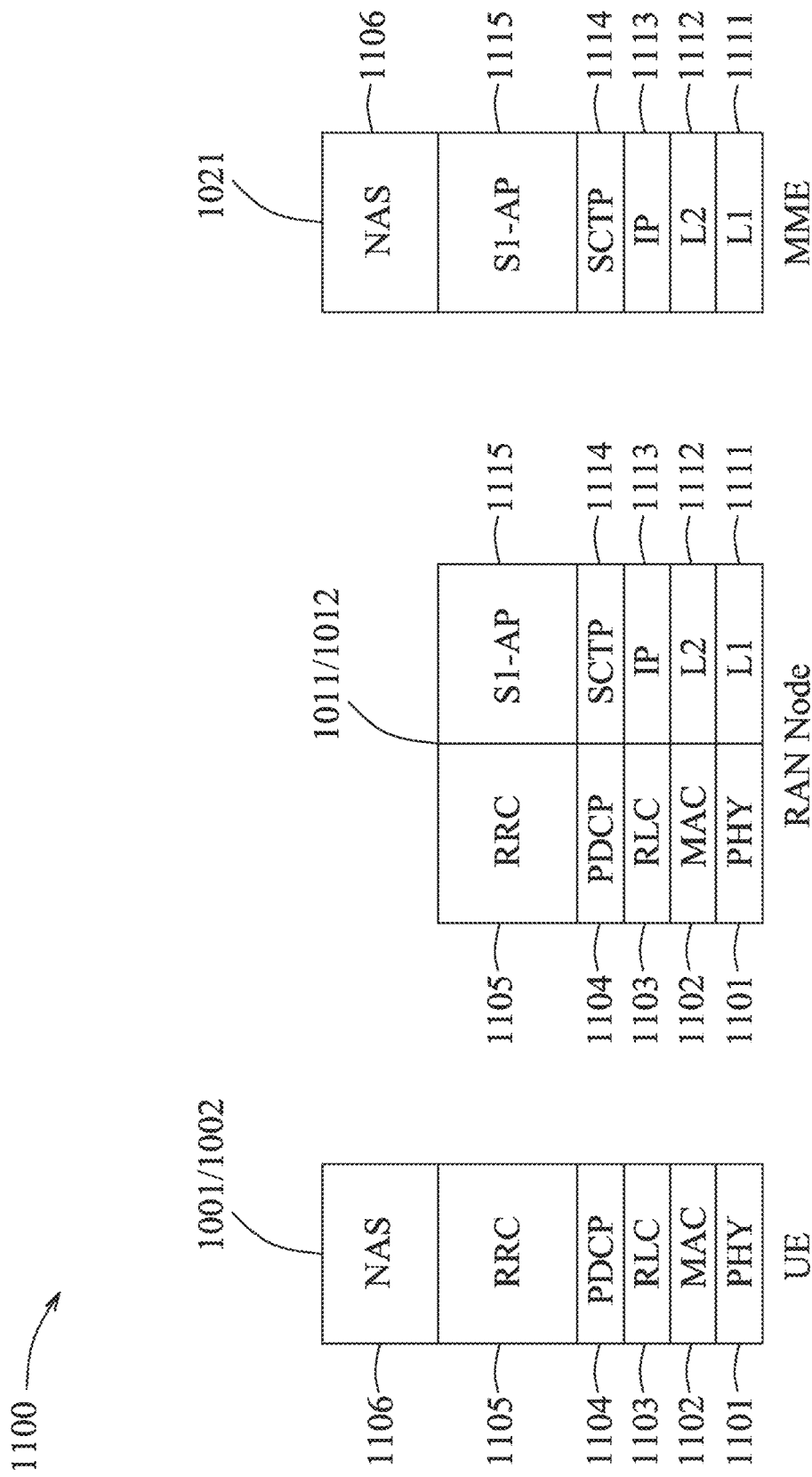
FIG. 11 illustrates an example of a control plane protocol stack according to some embodiments of this disclosure.

FIG. 11 illustrates an example of a control plane protocol stack according to some embodiments of this disclosure. In the example of FIG. 11, a control plane 1100 is shown as a communications protocol stack between the UE 1001 (or alternatively, the UE 1002), the RAN node 1011 (or alternatively, the RAN node 1012), and the MME 1021.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to the PHY layer 1101 via transport channels, de-multiplexing MAC SDUs to one or more logical channels from transport blocks (TB) delivered from the PHY layer 1101 via transport channels, multiplexing MAC SDUs onto TBs, scheduling information reporting, error correction through hybrid automatic repeat request (HARQ), and logical channel prioritization.

The RLC layer 1103 may operate in a plurality of modes of operation, including Transparent Mode (TM), Unacknowledged Mode (UM) and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE 1001 or 1002 and the E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may include one or more information elements (IEs), which may each comprise individual data fields or data structures.

The UE 1001 and the RAN node 1011 of FIG. 10 may utilize a Uu interface (e.g., an LTE-Uu interface) to exchange control plane data via a protocol stack including the PHY layer 1101, the MAC layer 1102, the RLC layer 1103, the PDCP layer 1104 and the RRC layer 1105.

The non-access stratum (NAS) protocols 1106 form the highest stratum of the control plane between the UE 1001 or 1002 and the MME 1021. The NAS protocols 1106 support the mobility of the UE 1001 or 1002 and the session management procedures to establish and maintain IP connectivity between the UE 1001 or 1002 and the P-GW 1023 (see FIG. 10).

The S1 Application Protocol (S1-AP) layer 1115 may support the functions of the S1 interface, and include Elementary Procedures (EPs). An EP is a unit of interaction between the RAN node 1011 or 1012 and the CN 1020 (see FIG. 10). The S1-AP layer 1115 provides services that may include two groups, i.e., UE-associated services and non UE-associated services. These services perform functions including, but not limited to, E-UTRAN Radio Access Bearer (E-RAB) management, UE capability indication, mobility, NAS signaling transport, RAN Information Management (RIM), and configuration transfer.

A Stream Control Transmission Protocol (SCTP) layer 1114 may ensure reliable delivery of signaling messages between the RAN node 1011 or 1012 and the MME 1021 based, in part, on the IP protocol supported by the IP layer 1113. An L2 layer 1112 and an L1 layer 1111 may refer to communication links (e.g., wired or wireless) used by the RAN node 1011 or 1012 and the MME 1021 to exchange information.

The RAN node 1011 and the MME 1021 may utilize an S1-MME interface to exchange control plane data via a protocol stack including the L1 layer 1111, the L2 layer 1112, the IP layer 1113, the SCTP layer 1114, and the S1-AP layer 1115.

Figure 12:
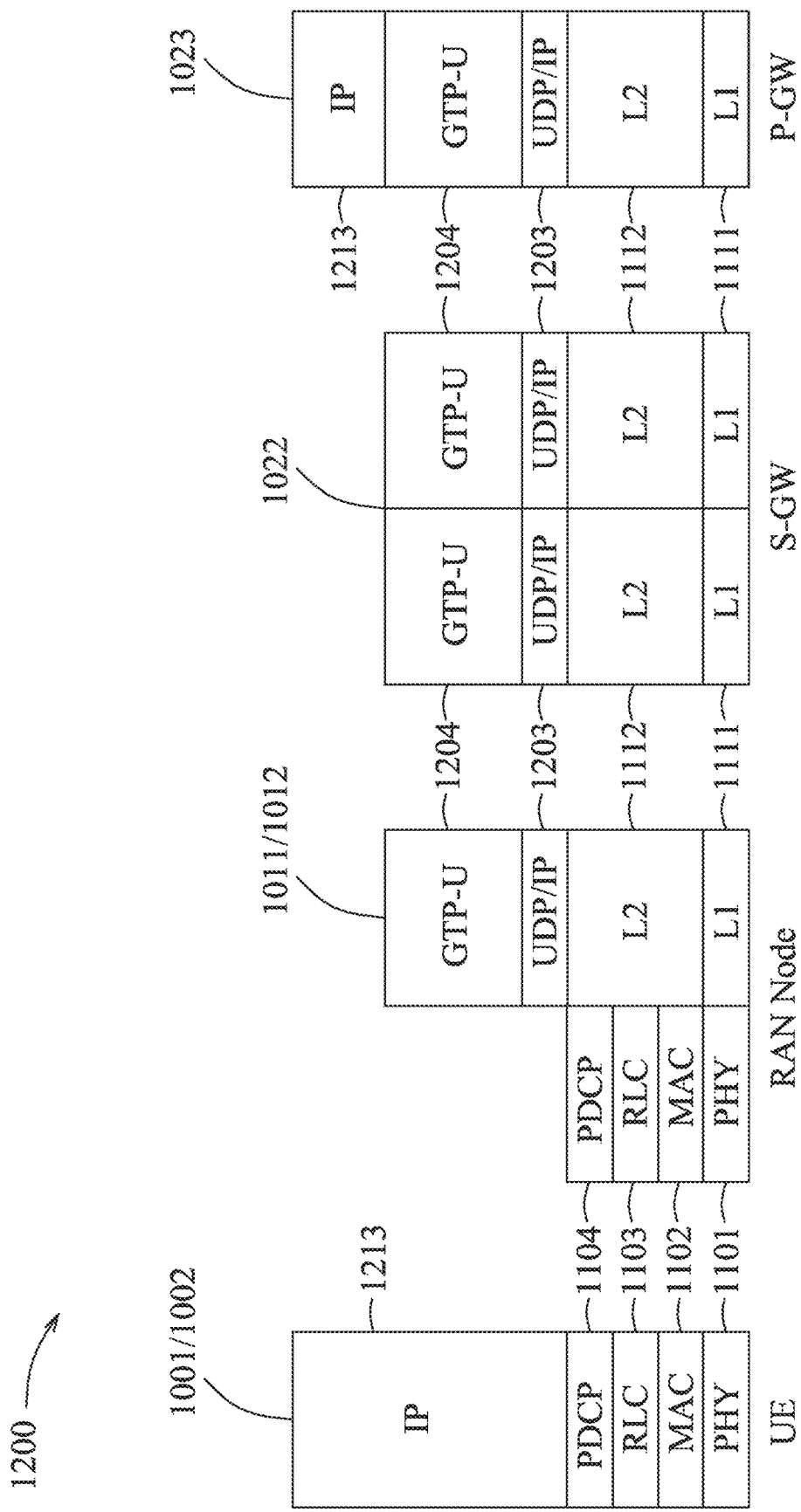
FIG. 12 illustrates an example of a user plane protocol stack according to some embodiments of this disclosure.

FIG. 12 illustrates an example of a user plane protocol stack according to some embodiments of this disclosure. In this example, a user plane 1200 is shown as a communications protocol stack between the UE 1001 (or alternatively, the UE 1002), the RAN node 1011 (or alternatively, the RAN node 1012), the S-GW 1022, and the P-GW 1023. The user plane 1200 may utilize at least some of the same protocol layers as the control plane 1100 of FIG. 11. For example, the UE 1001 or 1002 and the RAN node 1011 or 1012 may utilize a Uu interface (e.g., an LTE-Uu interface) to exchange user plane data via a protocol stack also including a PHY layer 1101, a MAC layer 1102, an RLC layer 1103 and a PDCP layer 1104 (see FIG. 11).

A General Packet Radio Service (GPRS) Tunneling Protocol for the user plane (GTP-U) layer 1204 may be used for carrying user data within the GPRS core network and between the radio access network and the core network. The user data transported can be packets in any of IPv4, IPv6, or PPP formats. A UDP and IP security (UDP/IP) layer 1203 may provide checksums for data integrity, port numbers for addressing different functions at the source and destination, and encryption and authentication on the selected data flows. The RAN node 1011 or 1012 and the S-GW 1022 may utilize an S1-U interface to exchange user plane data via a protocol stack including the L1 layer 1111, the L2 layer 1112, the UDP/IP layer 1203, and the GTP-U layer 1204. The S-GW 1022 and the P-GW 1023 may utilize an S5/S8a interface to exchange user plane data via a protocol stack including the L1 layer 1111, the L2 layer 1112, the UDP/IP layer 1203, and the GTP-U layer 1204. The protocol stack for the P-GW 1023 may further include the IP layer 1213. As discussed above with respect to FIG. 11, NAS protocols support the mobility of the UE 1001 or 1002 and the session management procedures to establish and maintain IP connectivity between the UE 1001 or 1002 and the P-GW 1023.

Figure 13:
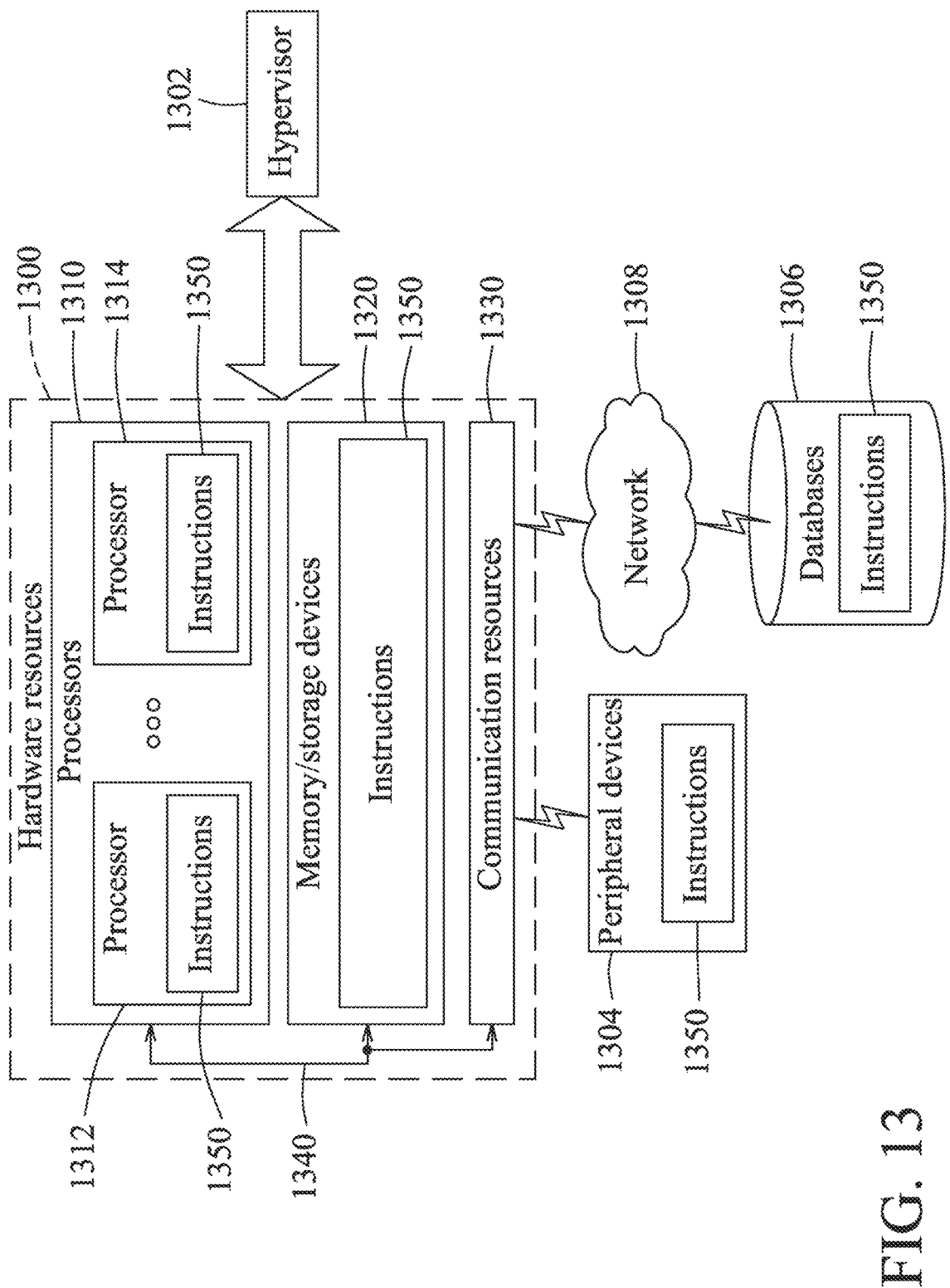
FIG. 13 is a block diagram illustrating components, according to some example embodiments, able to read instructions from a machine-readable or computer-readable medium and perform any one or more of the methodologies discussed herein.

FIG. 13 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For embodiments where node virtualization (e.g., NFV) is utilized, a hypervisor 1302 may be executed to provide an execution environment for one or more network slices/sub-slices to utilize the hardware resources 1300.

The processors 1310 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1312 and a processor 1314.

The memory/storage devices 1320 may include main memory, disk storage, or any suitable combination thereof. The memory/storage devices 1320 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

EXAMPLES

The following examples pertain to specific technology embodiments and point out specific features, elements, or actions that can be used or otherwise combined in achieving such embodiments.

Example 1 is an apparatus of user equipment (UE) for bandwidth part (BWP) activation and deactivation operation. The apparatus comprises baseband circuitry that includes a radio frequency (RF) interface, and one or more processors to: receive radio resource control (RRC) data via the RF interface; to configure a timer for a BWP according to the RRC data; and to trigger the timer for the BWP in response to detection of an event associated with an access node after the BWP has been activated.

In Example 2, the subject matter of Example 1 or any of the Examples described herein may further include that the one or more processors of the baseband circuitry are to configure an expiration time of the timer for the BWP as a BWP configuration parameter of the BWP.

In Example 3, the subject matter of Example 1 or any of the Examples described herein may further include that the one or more processors of the baseband circuitry are to, in response to receipt of a timer-start command from the RF interface, generate a confirmation of the timer-start command, send the confirmation to the RF interface, and trigger the timer.

In Example 4, the subject matter of Example 3 or any of the Examples described herein may further include that the one or more processors of the baseband circuitry are to deactivate the BWP when it is determined that there is no data transmission in the BWP before the timer expires.

In Example 5, the subject matter of Example 1 or any of the Examples described herein may further include that the one or more processors of the baseband circuitry are to trigger the timer for the BWP in response to detection of an event that there is data scheduled in the BWP.

In Example 6, the subject matter of Example 5 or any of the Examples described herein may further include that the one or more processors of the baseband circuitry are to restart the timer when it is determined that there is data transmission in the BWP before the timer expires.

In Example 7, the subject matter of Example 5 or any of the Examples described herein may further include that the one or more processors of the baseband circuitry are to deactivate the BWP when it is determined that there is no data transmission in the BWP before the timer expires.

In Example 8, the subject matter of Example 1 or any of the Examples described herein may further include that the one or more processors of the baseband circuitry are to configure a timer for a control resource set (CORESET) to serve as the timer for the BWP, the CORESET included in the BWP.

In Example 9, the subject matter of Example 8 or any of the Examples described herein may further include that the one or more processors of the baseband circuitry are to, in response to receipt of a timer-start command from the RF interface, generate a confirmation of the timer-start command, send the confirmation to the RF interface, and trigger the timer for the CORESET after the CORESET has been activated.

In Example 10, the subject matter of Example 9 or any of the Examples described herein may further include that the one or more processors of the baseband circuitry are to deactivate the CORESET when it is determined that there is no data transmission in the CORESET before the timer expires.

In Example 11, the subject matter of Example 8 or any of the Examples described herein may further include that the one or more processors of the baseband circuitry are to trigger the timer for the CORESET in response to detection of an event that there is data transmission in the CORESET after the CORESET has been activated.

In Example 12, the subject matter of Example 11 or any of the Examples described herein may further include that the one or more processors of the baseband circuitry are to restart the timer when it is determined that there is data transmission in the CORESET before the timer expires.

In Example 13, the subject matter of Example 11 or any of the Examples described herein may further include that the one or more processors of the baseband circuitry are to deactivate the CORESET when it is determined that there is no data transmission in the CORESET before the timer expires.

In Example 14, the subject matter of Example 8 or any of the Examples described herein may further include that the one or more processors of the baseband circuitry are to deactivate the BWP when it is determined that all CORESETs included in the BWP are deactivated.

In Example 15, the subject matter of Example 1 or any of the Examples described herein may further include that the one or more processors of the baseband circuitry are to switch the deactivated BWP to a default BWP, the default BWP having a smaller bandwidth than the deactivated BWP In Example 16, the subject matter of Example 1 or any of the Examples described herein may further include that the one or more processors of the baseband circuitry are to configure a timer for the default BWP with an expiration time equal to a discontinuous reception (DRX) time of the apparatus which is larger than any other expiration time.

Example 17 is an apparatus of a radio access network (RAN) node comprising baseband circuitry that includes: one or more processors to generate, for secondary cell (SCell) configuration, data that contain information regarding a carrier signal to be specifically allocated to a user equipment (UE) for informing the UE about a center frequency and a bandwidth of the carrier signal; and an RF interface to receive the data from the one or more processors.

In Example 18, the subject matter of Example 17 or any of the Examples described herein may further include that the one or more processors of the baseband circuitry are to generate the data to contain the information including a center frequency from a perspective of the RAN node, an offset from the center frequency from the perspective of the RAN node to a center frequency from a perspective of the UE and a bandwidth of the carrier signal from the perspective of the UE.

In Example 19, the subject matter of Example 17 or any of the Examples described herein may further include that the one or more processors of the baseband circuitry are to generate the data to contain the information including a center frequency from a perspective of the RAN node, and two offsets from the center frequency to respective ends of the carrier signal from a perspective of the UE.

In Example 20, the subject matter of Example 17 or any of the Examples described herein may further include that the one or more processors of the baseband circuitry are to generate the data to contain the information including a center frequency from a perspective of the UE, and a bandwidth of the carrier signal from the perspective of the UE.

Example 21 is an apparatus of user equipment (UE) for common physical resource block (PRB) indexing. The apparatus comprises baseband circuitry including a radio frequency (RF) interface, and one or more processors to: for a SCell carrier without a synchronization signal block (SSB), receive from the RF interface data that indicate an offset between a reference point and a lowest subcarrier of a reference PRB, which is a lowest PRB of a carrier from a perspective of an access node that allocates the SCell carrier to the apparatus; and configure data transmission with the access node according to the offset indicated by the data.

In Example 22, the subject matter of Example 21 or any of the Examples described herein may further include that the reference point is a lowest PRB of the SCell carrier from a perspective of the apparatus.

In Example 23, the subject matter of Example 21 or any of the Examples described herein may further include that the reference point is a PRB containing the center frequency of the carrier from the perspective of the access node.

In Example 24, the subject matter of Example 21 or any of the Examples described herein may further include that the reference point is a PRB containing the center frequency of the SCell carrier from a perspective of the apparatus.

In Example 25, the subject matter of Example 21 or any of the Examples described herein may further include that the reference point is a PRB containing the DC subcarrier.

In Example 26, the subject matter of Example 21 or any of the Examples described herein may further include that the reference point is a position of a virtual SSB which is not physically presented in the SCell carrier.

In Example 27, the subject matter of Example 26 or any of the Examples described herein may further include that the virtual SSB is a lowest PRB within the SCell carrier from a perspective of the apparatus.

Example 28 is an apparatus of user equipment (UE) comprising baseband circuitry including a radio frequency (RF) interface and one or more processors to, when there is an association between a downlink (DL) bandwidth part (BWP) and an uplink (UL) BWP: receive, from the RF interface, data containing downlink control information (DCI) that indicates a BWP configuration identifier (ID); and switch both the DL BWP and the UL BWP to a BWP corresponding to the BWP configuration ID.

In Example 29, the subject matter of Example 28 or any of the Examples described herein may further include that a format of the DCI is one of DL grant and UL grant.

In Example 30, the subject matter of Example 28 or any of the Examples described herein may further include that the one or more processors of the baseband circuitry are to, when there is no association between the DL BWP and the UL BWP: receive, from the RF interface, data containing the DCI for DL BWP switching that indicates a DL BWP configuration ID, and switch the DL BWP to another DL BWP corresponding to the DL BWP configuration ID indicated by the DCI.

In Example 31, the subject matter of Example 30 or any of the Examples described herein may further include that the DCI for DL BWP switching is a DL grant scheduling DCI.

In Example 32, the subject matter of Example 28 or any of the Examples described herein may further include that the one or more processors of the baseband circuitry are to, when there is no association between the DL BWP and the UL BWP: receive, from the RF interface, data containing the DCI for UL BWP switching that indicates a UL BWP configuration ID; and switch the UL BWP to another UL BWP corresponding to the UL BWP configuration ID indicated by the DCI.

In Example 33, the subject matter of Example 32 or any of the Examples described herein may further include that the DCI for UL BWP switching is a UL grant scheduling DCI.

Example 34 is an apparatus of user equipment (UE) to support bandwidth part (BWP) switching without scheduling. The apparatus comprising baseband circuitry that includes: a radio frequency (RF) interface, and one or more processors to: receive, from the RF interface, data containing a bit indicator that indicates BWP switching only; and switch a current BWP to another BWP.

In Example 35, the subject matter of Example 34 or any of the Examples described herein may further include that the data received by the one or more processors of the baseband circuitry is downlink control information (DCI), and the bit indicator is an expression of a bit field in the DCI serving the purpose of BWP switching only.

In Example 36, the subject matter of Example 35 or any of the Examples described herein may further include that the bit field in the DCI includes one of resource block (RB)

assignment bits, modulation and coding scheme (MCS) bits, a hybrid automatic repeat request (HARQ) process number, and any combination thereof.

Example 37 is an apparatus of user equipment (UE) comprising baseband circuitry including a radio frequency (RF) interface, and one or more processors to: receive, from the RF interface, radio resource control (RRC) configuration data that indicate a set of bandwidth parts (BWPs); and configure, according to the RRC configuration data, the set of BWPs, in which a BWP is to be activated for data transmission with an access node.

In Example 38, the subject matter of Example 37 or any of the Examples described herein may further include that a total number of BWPs in the set of BWPs indicated by the RRC configuration data is fixed to an integer number K, the BWPs have respective BWP identifiers (IDs) ranging from 1 to K, and a total of log 2 K bits are used to express the BWP IDs.

In Example 39, the subject matter of Example 37 or any of the Examples described herein may further include that the RRC configuration data further indicate a range of configurable BWP IDs, the range being an integer number K', the number of BWPs in the set of BWPs configured by the one or more processors does not exceed the integer number K', and a total of log 2 K' bits are used to express the BWP IDs.

Example 40 is an apparatus of user equipment (UE) comprising a baseband circuitry including a radio frequency (RF) interface, and one or more processors to: receive, from the RF interface, downlink control information (DCI) including a bandwidth part (BWP) activation command and a BWP identifier (ID); and activate a BWP corresponding to the BWP ID.

In Example 41, the subject matter of Example 40 or any of the Examples described herein may further include that the DCI is a scheduling DCI which describes resource allocation (RA), the description of the RA including the BWP ID.

In Example 42, the subject matter of Example 41 or any of the Examples described herein may further include that the scheduling DCI includes a plurality of BWP IDs for activation of a plurality of BWPs.

In Example 43, the subject matter of Example 42 or any of the Examples described herein may further include that the BWP IDs of the scheduling DCI are indicated by a bitmap.

In Example 44, the subject matter of Example 41 or any of the Examples described herein may further include that the scheduling DCI includes both an uplink (UL) BWP ID and a downlink (DL) BWP ID.

In Example 45, the subject matter of Example 41 or any of the Examples described herein may further include that the scheduling DCI includes a DL BWP ID.

In Example 46, the subject matter of Example 41 or any of the Examples described herein may further include that the scheduling DCI includes a UL BWP ID.

In Example 47, the subject matter of Example 40 or any of the Examples described herein may further include that the DCI is a separate BWP activation DCI which is used for a dedicated purpose of BWP activation and which includes the BWP ID corresponding to the BWP expected to be activated.

In Example 48, the subject matter of Example 47 or any of the Examples described herein may further include that the separate BWP activation DCI includes a plurality of BWP IDs for activation of a plurality of BWPs.

In Example 49, the subject matter of Example 48 or any of the Examples described herein may further include that the BWP IDs of the separate BWP activation DCI are indicated by a bitmap.

In Example 50, the subject matter of Example 48 or any of the Examples described herein may further include that the one or more processors of the baseband circuitry are to receive, from the RF interface, a scheduling DCI which indicates one of the BWP IDs corresponding to one of the BWPs to be scheduled for data transmission.

In Example 51, the subject matter of Example 47 or any of the Examples described herein may further include that the separate BWP activation DCI includes only one BWP ID, and the one or more processors of the baseband circuitry are to receive, from the RF interface, a scheduling DCI which does not indicate the BWP ID corresponding to the BWP to be scheduled for data transmission.

In Example 52, the subject matter of Example 47 or any of the Examples described herein may further include that the separate BWP activation DCI includes a timer value for timer-based BWP switching.

In Example 53, the subject matter of Example 47 or any of the Examples described herein may further include that the separate BWP activation DCI includes time provisioned for RF switching.

In Example 54, the subject matter of Example 47 or any of the Examples described herein may further include that the separate BWP activation DCI is used for both UL BWP activation and DL BWP activation.

In Example 55, the subject matter of Example 47 or any of the Examples described herein may further include that the separate BWP activation DCI is used for DL BWP activation.

In Example 56, the subject matter of Example 47 or any of the Examples described herein may further include that the separate BWP activation DCI is used for UL BWP activation.

In Example 57, the subject matter of Example 40 or any of the Examples described herein may further include that activation of the BWP is within a configured carrier and does not span over different carriers.

Example 58 is an apparatus of user equipment (UE) for cross-bandwidth-part (cross-BWP) scheduling. The apparatus comprises baseband circuitry that includes a radio frequency (RF) interface, and one or more processors to: receive, from the RF interface, downlink control information (DCI) that indicates resource allocation (RA) in a next BWP, the apparatus expected to switch from a current BWP to the next BWP. A size of a bit field for describing the RA in the DCI is fixed and does not change for different BWPs, a total bit size for the DCI is fixed and does not change for different BWPs, and used bits among the bit field for describing the RA are dependent on the current BWP and the next BWP.

In Example 59, the subject matter of Example 58 or any of the Examples described herein may further include that the size of the bit field for describing the RA in the DCI is N bits and is associated with a largest supported bandwidth of a BWP, and the one or more processors of the baseband circuitry are to, for the next BWP having a smaller bandwidth, interpret the first n bits in the bit field for describing the RA indicated by the DCI, where n is an integer smaller than N.

In Example 60, the subject matter of Example 58 or any of the Examples described herein may further include that the one or more processors of the baseband circuitry are to determine a BWP identifier (ID) of the next BWP.

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of the term "embodiment" and other language does not necessarily refer to the same embodiment or the same example, but may refer to different and distinct embodiments, as well as potentially the same embodiment.

What is claimed is:

1. A user equipment (UE) for communication with an access node, the UE comprising baseband circuitry including:
   a radio frequency (RF) interface; and
   one or more processors configured to:
      for a secondary cell (SCell) carrier without a synchronization signal block (SSB), receive from the RF interface data that indicates an offset between a reference point and a lowest subcarrier of a reference physical resource block (PRB), wherein the reference PRB is a lowest PRB of a carrier from a perspective of the access node that allocates the SCell carrier to the UE; and
      configure data transmission with the access node according to the offset indicated by the received data.

2. The UE of claim 1, wherein the reference point is a lowest PRB of the SCell carrier from a perspective of the UE.

3. The UE of claim 1, wherein the reference point is a PRB containing a center frequency of the SCell carrier from the perspective of the access node.

4. The UE of claim 1, wherein the reference point is a PRB containing a center frequency of the SCell carrier from a perspective of the UE.

5. The UE of claim 1, wherein the reference point is a PRB containing a direct current (DC) subcarrier.

6. The UE of claim 1, wherein the reference point is a position of a virtual SSB which is not physically present in the SCell carrier from a perspective of the UE.

7. The UE of claim 1, wherein the offset defines a common PRB indexing that is common to multiple UEs sharing a wideband component carrier (CC).

8. A method of operating a user equipment (UE) for communication with an access node, comprising:
   receiving, for a secondary cell (SCell) carrier without a synchronization signal block (SSB), from a radio frequency (RF) interface, data indicating an offset between a reference point and a lowest subcarrier of a reference physical resource block (PRB), wherein the reference PRB is a lowest PRB of a carrier from a perspective of the access node that allocates the SCell carrier to the UE; and
   configuring data transmission with the access node according to the offset indicated by the received data.

9. The method of claim 8, wherein the reference point is a lowest PRB of the SCell carrier from a perspective of the UE.

10. The method of claim 8, wherein the reference point is a PRB containing a center frequency of the SCell carrier from the perspective of the access node.

11. The method of claim 8, wherein the reference point is a PRB containing a center frequency of the SCell carrier from a perspective of the UE.

12. The method of claim 8, wherein the offset defines a common PRB indexing that is common to multiple UEs sharing a wideband component carrier (CC).

* * * * *